United States Patent [19]
Lauer et al.

[11] Patent Number: 6,118,936
[45] Date of Patent: Sep. 12, 2000

[54] SIGNALING NETWORK MANAGEMENT SYSTEM FOR CONVERTING NETWORK EVENTS INTO STANDARD FORM AND THEN CORRELATING THE STANDARD FORM EVENTS WITH TOPOLOGY AND MAINTENANCE INFORMATION

[75] Inventors: Douglas Gerard Lauer, Colorado Springs; Michael Robert Smith, Monument, both of Colo.

[73] Assignee: MCI Communications Corporation, Washington, D.C.

[21] Appl. No.: 08/634,715

[22] Filed: Apr. 18, 1996

[51] Int. Cl.[7] .......................... G06F 15/16; G06F 11/34; H04M 1/24
[52] U.S. Cl. .................. 395/200.53; 370/244; 379/14
[58] Field of Search ................... 370/241, 242, 370/244, 250, 252, 254, 255, 245; 395/200.53, 200.54; 379/1, 9, 14

[56] References Cited

U.S. PATENT DOCUMENTS

| | | | |
|---|---|---|---|
| 4,156,109 | 5/1979 | Kraushaar et al. | 179/8 |
| 4,330,688 | 5/1982 | Tiribelli | 179/8 |
| 4,456,788 | 6/1984 | Kline et al. | 179/7 |
| 4,546,467 | 10/1985 | Yamamoto | 370/13 |
| 4,603,233 | 7/1986 | Englert et al. | 179/8 |
| 4,750,175 | 6/1988 | Brenneman et al. | 371/22 |
| 5,068,892 | 11/1991 | Livanos | 379/221 |
| 5,197,127 | 3/1993 | Waclawsky et al. | 395/200 |
| 5,359,649 | 10/1994 | Rosu et al. | 379/220 |
| 5,375,126 | 12/1994 | Wallace | 371/20 |
| 5,437,009 | 7/1995 | Lane | 345/349 |
| 5,473,596 | 12/1995 | Garafola et al. | 370/241 |
| 5,475,732 | 12/1995 | Pester, III | 379/34 |
| 5,488,715 | 1/1996 | Wainwright | 395/182.02 |
| 5,513,171 | 4/1996 | Ludwiczak et al. | 370/254 |
| 5,528,759 | 6/1996 | Moore | 395/200.54 |
| 5,546,450 | 8/1996 | Suthard et al. | 379/207 |
| 5,579,384 | 11/1996 | Seymour | 379/243 |
| 5,680,390 | 10/1997 | Robrock, II | 370/229 |
| 5,684,866 | 11/1997 | Florindi et al. | 379/114 |
| 5,692,030 | 11/1997 | Teglovic et al. | 379/14 |
| 5,748,098 | 5/1998 | Grace | 340/825.16 |

OTHER PUBLICATIONS

Bieszczad, A., et al., "Customization of Network Surveillance Expert Systems," GLOBECOM '92: IEEE Global Telecomm. Conf., IEEE, pp. 1250–1254.

*Primary Examiner*—Parshotam S. Lall
*Assistant Examiner*—Andrew Caldwell

[57] ABSTRACT

A signaling network management system (SNMS) collects network topology, traffic, performance and fault information, correlates that information and displays the information to system operators. It includes a distributed client/server platform that receives and processes information relating to network events that is generated by various signaling network elements. Each network event is parsed and formatted to a standardized format to allow processing of events generated by any type of element. The formatted events are correlated and displayed to system operators. Correlation of the different types of events is performed using programmable analysis rules. The system also correlates signaling network events with transmission alarms and network maintenance schedule information. This allows the system operators to account for outages due to transmission events, such as fiber cuts, and to network maintenance. It also allows operator to worn maintenance personnel of maintenance impacting events. The system employs extensive topology processing of both carrier-owned and foreign networks. This allows system operators to perform impact assessments, such as which customers are affected by specific events. The system provides a graphical interface to operators that allows localized displays, so that only events and impacts pertaining to a specific STP cluster or LATA, for example, are shown. An interface to an external trouble management system allows system operator to submit trouble tickets for signaling network events, without the restriction of a proprietary trouble management system.

35 Claims, 26 Drawing Sheets

Over Ride File

- Node
- Circuit
- Home STP
- Mate STP
- DS3 to DS1 Mapping

FIG. 7k

| NPA-NXX Information for EUGNOR28DSO | |
|---|---|
| EO CLLI | NPA-NXX |
| EUGNOR28DSO | 503-461 |
| EUGNOR28DSO | 503-607 |
| EUGNOR28DSO | 503-688 |
| EUGNOR28DSO | 503-689 |
| EUGNOR28DSO | 541-461 |
| EUGNOR28DSO | 541-607 |
| EUGNOR28DSO | 541-688 |
| EUGNOR28DSO | 541-689 |

Dismiss

Trunk group for HLB2

| EO CLLI | SWITCH | TRUNK GROUP | SERVICE TYPE |
|---|---|---|---|
| WRW NYXADS0 | HLB2 | 0097 | DD |
| NYCMNY3706T | HLB2 | 0098 | WOS |
| ALBYNYSS5GT | HLB2 | 0099 | WOS |
| PGHKNYSH11T | HLB2 | 0100 | WOS |
| GLVVNYSA01T | HLB2 | 0102 | WOS |
| KNDRNYXA2GT | HLB2 | 0103 | WOS |
| WRWKNYASDS0 | HLB2 | 0104 | DD |
| NYCNNYYBDS0 | HLB2 | 0105 | TLP |
| ALBYNYSS5GT | HLB2 | 0109 | DT |
| MDTWNNYXA03T | HLB2 | 0111 | WPS |
| MDTWNYXA03T | HLB2 | 0112 | WOS |
| CBLSNYZBDS0 | HLB2 | 0113 | DD |
| MALLNNMMDS0 | HLB2 | 0114 | DD |
| HPJTNYXBDS1 | HLB2 | 0115 | DD |
| WLDNNYXCDS0 | HLB2 | 0116 | DD |
| GSHNNYXADS0 | HLB2 | 0117 | DD |
| NYCKNYWM12T | HLB2 | 0121 | DT |
| NYCMNYBW21T | HLB2 | 0122 | DT |
| HRFRCT037GT | HLB2 | 0123 | DT |
| HLB2 | AST3 | 0200 | IMT |

Dismiss

| Default Filter Detail | | | |
|---|---|---|---|
| Alarm Type (Include) | Severity (Include) | Customer Name (Include) | Outages (Exclude) |
| ☐ Link and Linkset<br>☐ Link and Routeset Congestion<br>☐ PMU<br>☐ Route and Routeset | ☐ INFORMATIONAL<br>☐ WARNING<br>☐ MINOR<br>☐ MAJOR<br>☐ CRITICAL | ☐ CUSTOMER1<br>☐ CUSTOMER2<br>☐ CUSTOMER3<br>☐ CUSTOMER4<br>☐ CUSTOMER5<br>☐ CUSTOMER6<br>☐ CUSTOMER7<br>☐ CUSTOMER8 | ☐ 258371CSOUTG00003E<br>☐ 258372D4RELE000013<br>☐ 2583720RELE000013D<br>☐ 2583739DRELE000014<br>☐ 258373FARELE000014<br>☐ 258373FBRELE000014<br>☐ 2583749BRELE0000014<br>☐ 2583764ERELE0000015 |
| [All] [Clear] | [All] [Clear] | [All] [Clear] | [All] [Clear] |

☐ Acknowledged    ☐ Include DDN Maintenance
☐ Unacknowledged    ☐ Include non-DDN Maintenance Filter Name: [_____]

[Create] [Modify] [Activate] [Clear All] [Cancel]

FIG. 8i

SIGNALING NETWORK MANAGEMENT SYSTEM FOR CONVERTING NETWORK EVENTS INTO STANDARD FORM AND THEN CORRELATING THE STANDARD FORM EVENTS WITH TOPOLOGY AND MAINTENANCE INFORMATION

BACKGROUND OF THE INVENTION

1. Field of the Invention

The invention relates generally to telecommunications network management, and more specifically to a system and method for analyzing, correlating, and presenting signaling network events.

2. Background Information

Modem telecommunications systems use out-of-band signaling to communicate information relating to connections and transactions. Out-of-band signaling is accomplished by a signaling network which is separate from the voice network. Several such signaling systems are commonly in use, such as, for example, ANSI SS7, ITU CCS7 and CCS6. Even though they may share some hardware, logically and operationally the signaling network is a separate network from the voice network.

The use of a separate signaling network allows numerous enhancements in telecommunications service. However, it also requires that the signaling network be managed separately from the voice network. In order to manage a signaling network, such as an SS7 network, three types of information must be collected and managed. The first is network topology information. This is information about the subnetworks which make up the overall network and about the connections within and between each subnetwork. The second type of information is traffic information. This is information about the message traffic in each subnetwork and in the overall network. The third type of information is alarm information. This is information about any problems with the signaling network which have been detected by network monitoring devices.

A typical SS7 network is illustrated in FIG. 1. A call-bearing telecommunications network makes use of matrix switches 102a/102b for switching customer traffic. These switches 102a/102b are conventional, such as, for example a DMS-250 manufactured by Northern Telecom, an AXE manufactured by Ericsson or a DEX-600 manufactured by Digital Switch Corporation. These switches 102a/102b are interconnected with voice-grade and data-grade call-bearing trunks. This interconnectivity, which is not illustrated in FIG. 1, may take on a large variety of configurations. Customers may include any person or entity which is served by the telecommunications network, for example, end users, foreign networks, serving areas, local exchange carriers, etc.

To utilize SS7 signaling, each switch is configured with special hardware and software that serves as an SS7 interface to that switch. This SS7 component is known generally as a Signal Point (SP) 102a/102b. The SP 102a/102b serves as an interface between the SS7 signaling network and the switch for call setup, processing, routing, and breakdown. The SP 102a/102b also serves as an SS7 signal converter for SS7 switches that must interface with non-SS7 switches.

Signal Transfer Points (STPs) 104a. . . 104f (collectively referred to as 104) are packet-switching communications devices used to switch and route SS7 signals. They are deployed in mated pairs, known as clusters, for redundancy and restoration. For example, in FIG. 1, STP 104a is mated with STP 104b in Regional Cluster 122, STP 104c is mated with STP 104d in Regional Cluster 124, and STP 104e is mated with STP 104f in Regional Cluster 126. A typical SS7 network contains a plurality of STP clusters 104; three such clusters are shown in FIG. 1 for illustrative purposes. Each STP cluster 104 serves a particular geographic region of SPs 102. A plurality of SPs 102 have primary SS7 links to each of two STPs 104 in a cluster. This serves as a primary homing arrangement. Only two SPs 102 are shown homing to Regional Cluster 126 in FIG. 1 for illustrative purposes; in reality, several SPs 102 will home on a particular STP cluster 104. SPs 102 will also generally have a secondary SS7 link to one or both STPs 104 in another cluster. This serves as a secondary homing arrangement.

The SS7 links that connect the various elements are identified as follows:

A links 110 connect an SP to each of its primary STPs (primary homing).

B links 112 connect an STP in one cluster to an STP in another cluster.

C links 114 connect one STP to the other STP in the same cluster.

D links connect STPs between different carrier networks (not illustrated).

E links 118 connect an SP to an STP that is not in its cluster (secondary homing).

F links 120 connect two SPs to each other.

To interface two different carriers' networks, such as a Local Exchange Carrier (LEC) network with an Interexchange Carrier (IEC) network, STP clusters 104 from each carriers' network may be connected by D links or A links. SS7 provides standardized protocol for such an interface so that the signaling for a call that is being passed between an LEC and an IEC may also be transmitted.

When a switch receives and routes a customer call, the signaling for that call is received (or generated) by the attached SP 102. While intermachine trunks that connect the switches carry the customer's call, the signaling for that call is sent to an STP 104. The STP 104 routes the signal to either the SP 102 for the call-terminating switch, or to another STP 104 that will then route the signal to the SP 102 for the call-terminating switch.

SPs and STPs are machines that can generate information relating to network conditions and problems. However, the links are simply circuits: end-to-end connections which cannot themselves generate information. In order to extract circuit related information, Protocol Monitoring Units (PMUs) 106, as shown in FIG. 2, are used. PMUs 106 are deployed at switch sites and provide a monitoring tool independent of SPs and STPs. These devices, such as those manufactured by INET Inc. of Richardson, Tex., monitor the A, E, and F links of the SS7 network, as shown in FIG. 2. They generate fault and performance information for SS7 links.

As with any telecommunications network, an SS7 network is vulnerable to fiber cuts, other transmission outages, and device failures. Since an SS7 network carries all signaling required to deliver customer traffic, it is vital that any problems are detected and corrected quickly. Therefore, there is an essential need for a system that can monitor SS7 networks, analyze fault and performance information, and manage corrective actions. In order to perform these functions, the system must obtain and utilize information about the network topology, message traffic, network performance and network faults. This information must be correlated; that is, information must be matched with related information so as to provide a coherent view of the network.

Prior art SS7 network management systems, while performing these basic functions, have several shortcomings. Many require manual entry of network topology information, which is vulnerable to human error and delay topology updates. Configuration of these systems usually requires that the system be down for a period of time. While some prior art systems do obtain topology information in an automated process, these systems typically can obtain only a portion of the topology information which is required. These systems obtain the information only from PMUs, thereby neglecting network elements not connected to a PMU. Furthermore, these systems are typically intended to operate with only one particular vendor's PMU and cannot obtain information from other vendor's equipment. These prior art systems do not provide correlation between PMU events and events generated from other types of SS7 network elements. They also provide inflexible and proprietary analysis rules for event correlation.

A need exists for an SS7 network management system which can collect network topology, traffic, performance and fault information, correlate that information and display it in a coherent and useful manner to system operators. The system needs the capability of obtaining topology information in an automated, near-real-time manner from all network elements, regardless of type or vendor. A need exists for the system to allow system operators to select the display of information, in order to improve understandability of the information.

SUMMARY OF THE INVENTION

A signaling network management system (SNMS) of the present invention provides the capability to collect network topology, traffic, performance and fault information, correlate that information and display the information to system operators. The present invention provides the capability to obtain topology information in an automated, near-real-time manner from all network elements, regardless of type or vendor. The present invention also allows system operators great flexibility in selecting the information which is displayed and in the format of that display.

The present invention includes a distributed client/server platform that receives and processes information relating to network events that is generated by various SS7 network elements. Hereafter in this specification as well as in the claims, "event" encompasses a representation of the event as data or information. Each network event is parsed and formatted to a standardized format to allow processing of events generated by any type of element. The formatted events are analyzed, correlated and displayed to system operators. Event information may also be received by other systems external to the network management system. Such systems include, for example, network topology databases, transmission network management systems, and network maintenance schedules. Processed event information may be sent to other subsystems within the network management system. Such destinations include, for example, network topology databases, alarm databases and statistics databases.

Correlation of the different types of events is performed using programmable analysis rules. Correlation is performed in such a manner as to allow the users to view more aspects of an SS7 network than prior art systems provide, and to allow users to perform impact assessments on network events. It also allows customizable views of the state of the network. The system also correlates network events with network maintenance schedule information. This allows system operators to account for outages due to maintenance, and to warn maintenance personnel of maintenance impacting events. A programmable interface to an external trouble management system allows system operators to submit trouble tickets for SS7 events, without the restriction of a proprietary trouble management system.

BRIEF DESCRIPTION OF THE DRAWINGS

The above-mentioned objects and advantages of the present invention will be more clearly understood when considered in conjunction with the accompanying drawings, in which:

FIGS. 8b–8j are examples of the operator screen displays illustrating how the extensive topology processing of SNMS is used.

DETAILED DESCRIPTION OF THE INVENTION

Figure 1:
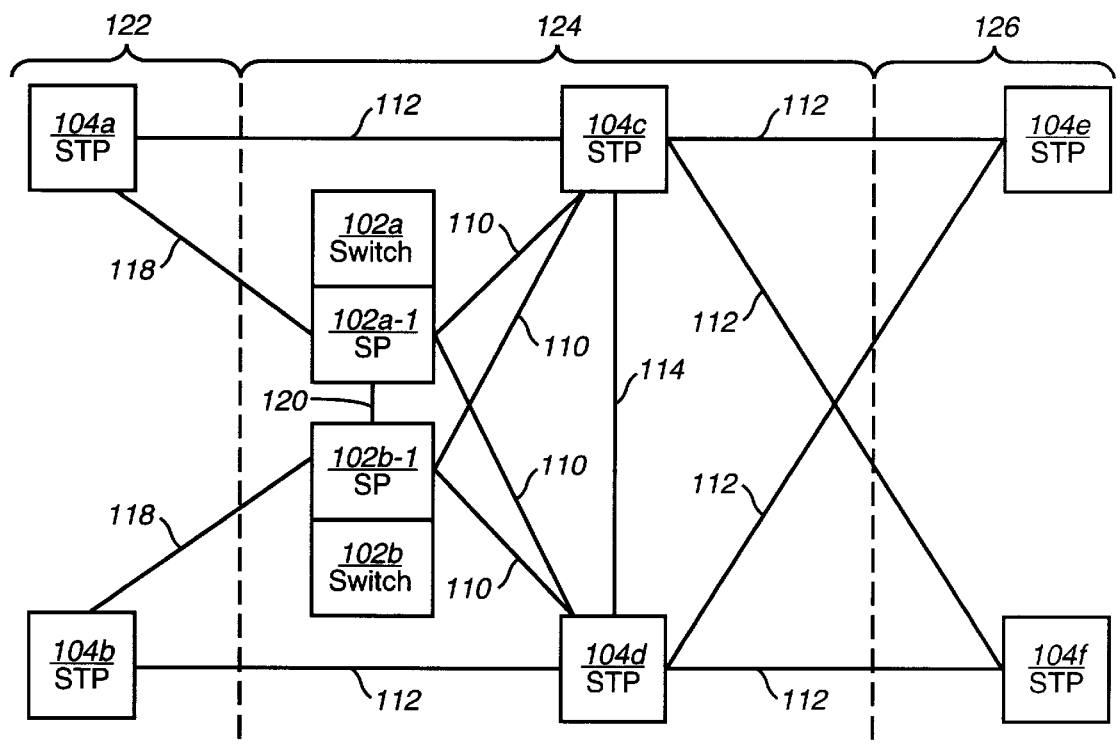
FIG. 1 is an exemplary block diagram of the architecture of a typical, prior-art SS7 network.
Figure 2:
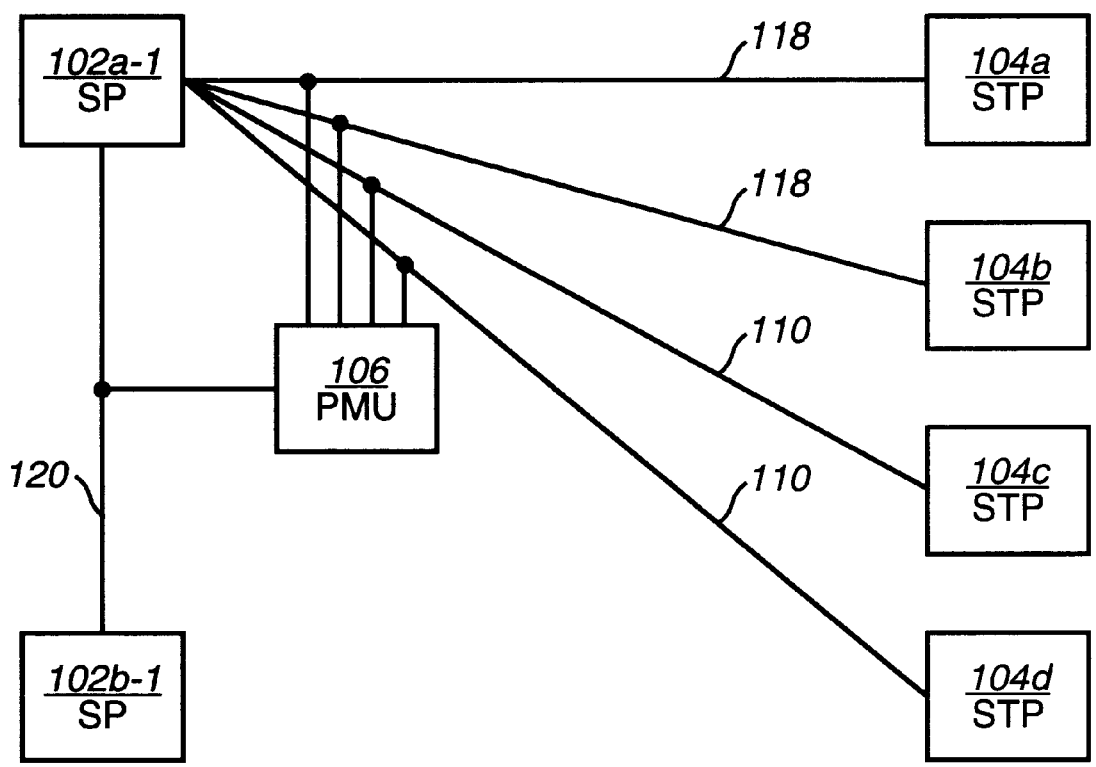
FIG. 2 is an exemplary block diagram of a typical, prior-art SS7 network which uses PMUs.
Figure 3:
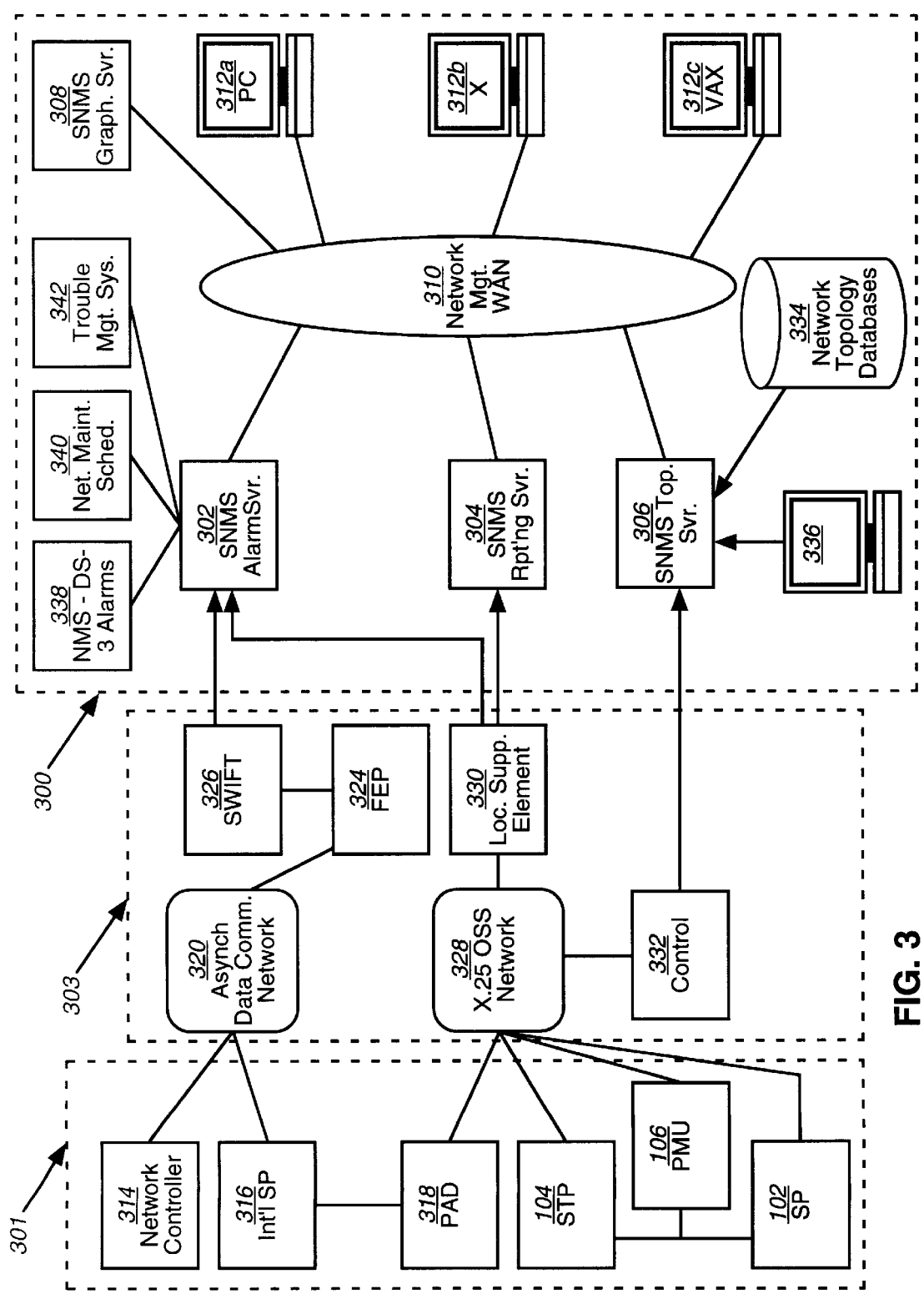
FIG. 3 is an exemplary block diagram of the one embodiment of the present invention.

Referring to FIG. 3, the systems architecture of the preferred embodiment of the present invention, referred to as a Signaling Network Management System 300 (SNMS), is illustrated. SNMS 300 is connected to SS7 network 301, which includes a plurality of network elements, via several elements of operational support network 303. SNMS 300 consists of four logical servers 302/304/306/308 and a plurality of client workstations 312a/312b/312c connected via a Network Management Wide Area Network (WAN) 310. The four logical SNMS servers 302/304/306/308 may all reside on a single or a plurality of physical units. In the preferred embodiment, each logical server resides on a distinct physical unit, for the purpose of enhancing performance. These physical units may be of any conventional type, such as IBM RS6000 units running with AIX operating system.

The client workstations 312 may be any conventional PC running with Microsoft Windows or IBM OS/2 operating systems, a dumb terminal, or a VAX VMS workstation. In actuality, client workstations may be any PC or terminal that has an Internet Protocol (IP) address, is running with X-Windows software, and is connected to the WAN 310. No SNMS-specific software runs on the client workstations 312.

SNMS 300 receives events from various SS7 network elements and other network management systems (NMS) 338. It also receives network topology, configuration, and maintenance data from various external systems, as will be described.

The various network elements that generate events include Network Controllers 314, International and Domestic SPs 316/102, STPs 104, and PMUs 106. Network Controllers 314 are devices that switch circuits based on external commands. They utilize SS7 signaling in the same manner as an SP 102, but are not linked to any STPs 104. International SPs 316 support switches that serve as a gateway between a domestic and international telecommunications network. The STPs 104 may be domestic or international.

The PMUs 106 scan all the SS7 packets that pass across the SS7 circuits, analyze for fault conditions, and generate network events that are then passed onto SNMS 300. The PMUs 106 also generate periodic statistics on the performance of the SS7 circuits that are monitored.

All SPs 102/316, STPs 104, PMU 106, and SS7 Network Controllers 314 transmit network events to SNMS 300 via communications networks. This eliminates the need for SNMS 300 to maintain a session with each of the devices. In one typical embodiment, as illustrated in FIG. 3, an Asynchronous Data Communications Network 320 is used to transport events from Network Controllers 314 and International SPs 316. An IBM mainframe Front End Processor (FEP) 324, such as IBM's 3708, is used to convert the asynchronous protocol to SNA so it can be received by a IBM mainframe-based Switched Host Interface Facilities Transport (SWIFT) system 326. SWIFT 326 is a communications interface and data distribution application that maintains a logical communications session with each of the network elements.

In this same embodiment, an X.25 Operational Systems Support (OSS) Network 328 is used to transport events from STPs 104, SPs 102, and PMUs 106. These events are received by a Local Support Element (LSE) system 330. The LSE 330, which may be a VAX/VMS system, is essentially a Packet Assembler/Disassembler (PAD) and protocol converter used to convert event data from the X.25 OSS Network 328 to the SNMS servers 302/304. It also serves the same function as SWIFT 326 in maintaining communication sessions with each network element, thus eliminating the need for SNMS 300 to do so. The need for both SWIFT 326 and LSE 330 illustrates one embodiment of a typical telecommunications network in which different types of elements are in place requiring different transport mechanisms. SNMS 300 supports all these types of elements.

All network events are input to the SNMS Alarming Server 302 for analysis and correlation. Some events are also input to the SNMS Reporting Server 304 to be stored for historical purposes.

A Control system 332, which may be a VAX/VMS system, is used to collect topology and configuration data from each of the network elements via the X.25 OSS Network 328 Some elements, such as STPs 104 and SPs 102, may send this data directly over the X.25 OSS Network 328. Elements such as the International SP 316, which only communicates in asynchronous mode, use a Packet Assembler/Disassembler (PAD) 318 to connect to the X.25 OSS Network 328. The Control system 332 then feeds this topology and configuration data to the SNMS Topology Server 306. Such a collection system typically has sufficient performance as to allow topology data to be collected in near real-time.

Network topology information is used by SNMS 300 to perform alarm correlation and to provide graphical displays. Most topology information is received from Network Topology Databases 334, which are created and maintained by order entry systems and network engineering systems in the preferred embodiment. Topology data is input to the SNMS Topology Server 306 from both the Network Topology Databases 334 and the Control System 332. An ability to enter manual overrides through use of a PC or X terminal device 336 is also provided to the SNMS Topology Server 306.

The SNMS Alarming Server 302 also receives events, in particular DS-3 transmission alarms, from other network management systems (NMS) 338. Using topology data, SNMS 300 will correlate these events with events received from SS7 network elements. The SNMS Alarming Server 302 also receives network maintenance schedule information from a Network Maintenance Schedule system 340. SNMS 300 uses this information to account for planned network outages due to maintenance, thus eliminating the need to respond to maintenance-generated alarms. SNMS 300 also uses this information to proactively warn maintenance personnel of a network outage that may impact a scheduled maintenance activity.

The SNMS Alarming Server 302 has an interface with a Trouble Management System 342. This allows SNMS users at the client workstations 312 to submit trouble tickets for SNMS-generated alarms. This interface, as opposed to using an SNMS-internal trouble management system, can be configured to utilize many different types of trouble management systems.

In the preferred embodiment, the SNMS Graphics Server 308 supports all client workstations 312 at a single site, and therefore may be a plurality of servers if a plurality of sites are used. The geographical distribution of SNMS Graphics Servers 308 eliminates the need to transmit volumes of data that support graphical presentation to each workstation site from a central location. Only data from the Alarming 302 and Reporting 304 servers are transmitted to workstation sites, thereby saving network transmission bandwidth and improving SNMS performance. In alternative embodiments, the Graphics Servers 308 may be centrally located.

Figure 4:
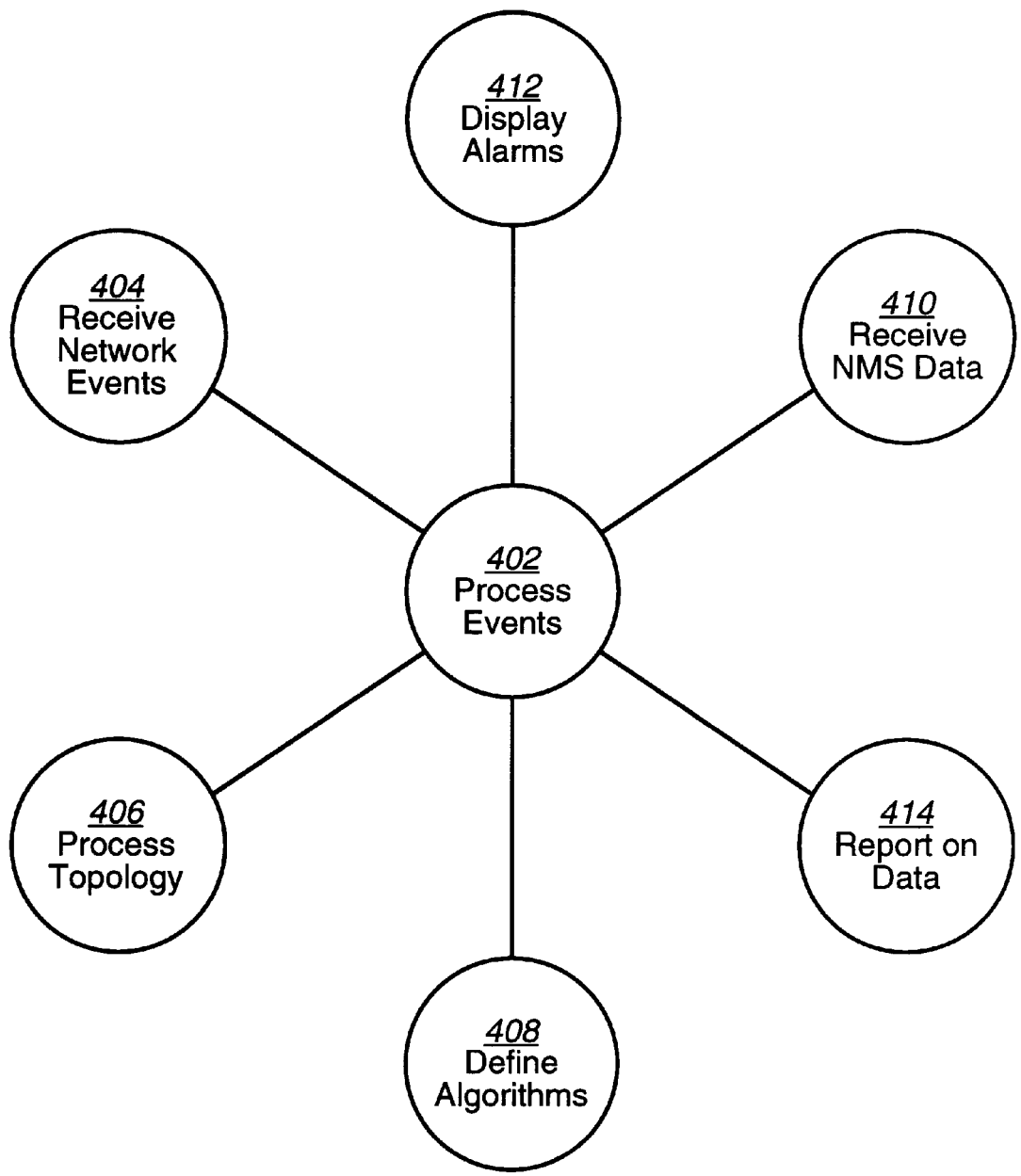
FIG. 4 is a high-level process flowchart illustrating the logical system components of the present invention.

Referring now to FIG. 4, a high-level process flowchart illustrates the logical system components of SNMS 300. At the heart of the process is Process Events 402. This component serves as a traffic cop for SNMS processes. Process Events 402, which runs primarily on the SNMS Alarming Server 302, is responsible for receiving events from other SNMS components, processing these events, storing events, and feeding processed event data to the Reporting and Display components. The Process Events process 402 is shown in greater detail in FIG. 5.

The Receive Network Events component 404, which runs primarily on the Alarming Server 302, receives network events from the various SS7 network elements (STPs 104, SPs 102, PMUs 106, etc.) via systems such as SWIFT 326 and LSE 330. It also receives network maintenance events from a Network Maintenance Schedule system 340. This component parses the events and sends them to Process Events 402 for analysis. The Receive Network Events process 404 is shown in greater detail in FIG. 6.

The Process Topology component 406, which runs primarily on the Topology Server 306, receives network topology and configuration data from the Network Topology Databases 334, from the SS7 network elements via the Control System 332, and from Manual Overrides 336. This data is used to correlate network events and to perform impact assessments on such events. It is also used to provide graphical presentation of events. Process Topology 406 parses these topology and configuration data, stores them, and sends them to Process Events 402 for analysis. The Process Topology process 406 is shown in greater detail in FIG. 7a.

The Define Algorithms component 408, which runs primarily on the Alarming Server 302, defines the specific parsing and analysis rules to be used by SNMS 300. These rules are then loaded into Process Events 402 for use in parsing and analysis. The algorithms are kept in a software module, and are defined by programmed code. A programmer simply programs the pre-defined algorithm into this software module, which is then used by Process Events 402.

These algorithms are procedural in nature and are based on network topology. They consist of both simple rules that are written in a proprietary language and can be changed dynamically by an SNMS user, and of more complex rules which are programmed within SNMS software code. No further detail of this process is needed.

The Receive NMS Data component 410, which runs primarily on the Alarming Server 302, receives events from other network management systems (NMS) 338. Such events include DS-3 transmission alarms. It then parses these events and sends them to Process Events 402 for analysis. No further detail of this process is needed.

The Display Alarms component 412, which runs primarily on the Graphics Server 308 and the Alarming Server 302, includes the Graphical User Interface (GUI) and associated software which supports topology and alarm presentation, using data supplied by Process Events 402. It also supports user interactions, such as alarm clears, acknowledgments, and trouble ticket submissions. It inputs these interactions to Process Events 402 for storing and required data updates. The Display Alarms process 412 is shown in greater detail in FIG. 8a.

The Report On Data component 414, which runs primarily on the Reporting Server 304, supports the topology and alarm reporting functions, using data supplied by Process Events 402. The Report On Data process 414 is shown in greater detail in FIG. 9.

Figure 5:
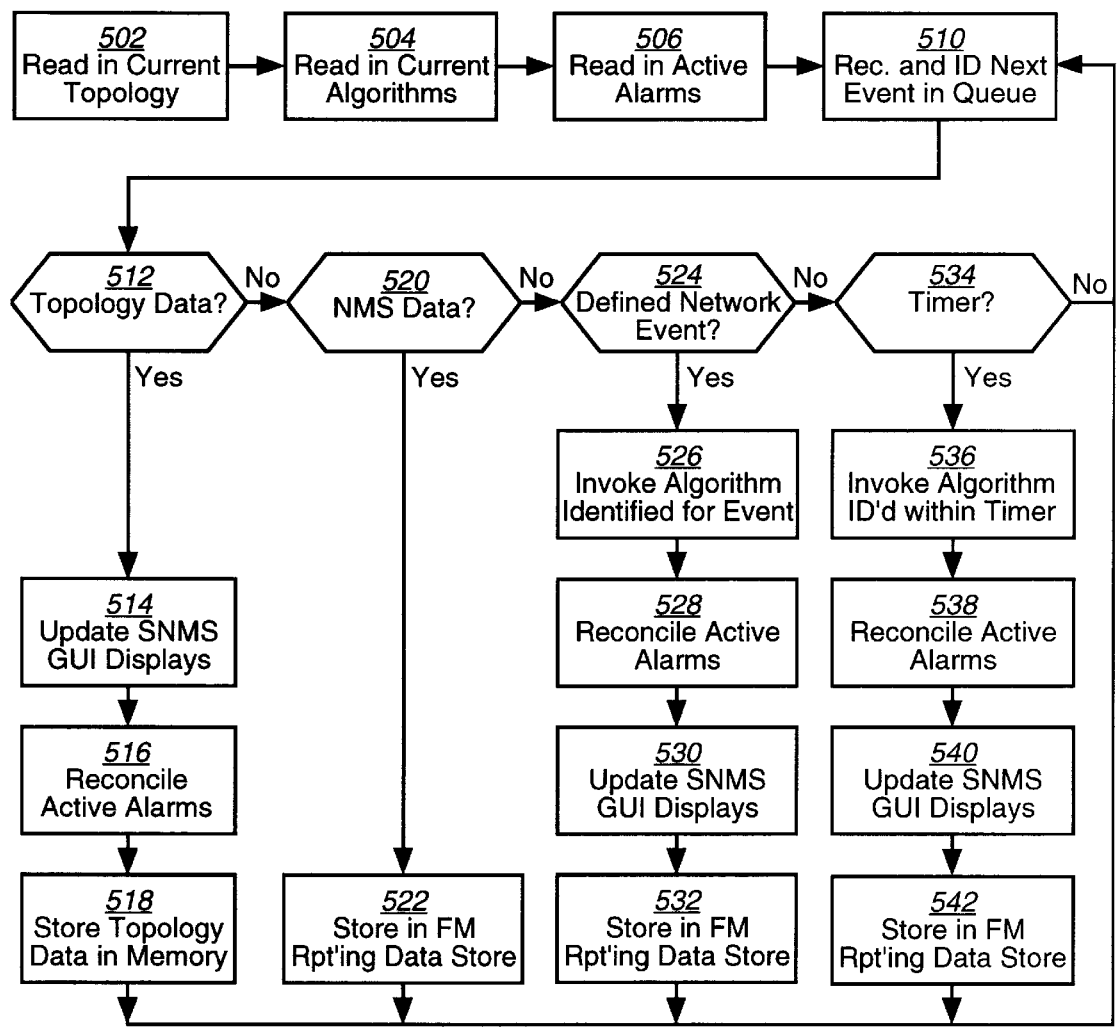
FIGS. 5, 6, 7a, 8a and 9 are process flowcharts illustrating the detailed operation of the components illustrated in FIG. 4.

Referring now to FIG. 5, the detailed process of the Process Events component 402 is illustrated. This is the main process of SNMS 300. It receives generalized events from other SNMS components, parses each event to extract relevant data, and identifies the type of event. If it is an SS7-related event, Process Events 402 applies a selected algorithm, such as create alarm or correlate to existing alarm.

The first three steps 502–506 are an initialization process that is run at the start of each SNMS session. They establish a state from which the system may work from. Steps 510–542 are then run as a continuous loop.

In step 502, current topology data is read from a topology data store on the Topology Server 306. This topology data store is created in the Process Topology process 406 and input to Process Events 402, as reflected in FIG. 4. The topology data that is read has been parsed in Process Topology 406, so it is read in step 502 by Process Events 402 as a standardized event ready for processing.

In step 504, the algorithms which are created in the Define Algorithms component 408 are read in. These algorithms determine what actions SNMS 300 will take on each alarm. SNMS 300 has a map of which algorithms to invoke for which type of alarm.

In step 506, alarm records from an internal active alarm database, which is created in the Report on Data process 414, are read in. This database stores active alarms only. Another database, the Fault Management (FM) reporting database, which is augmented in the Report on Data process 414, stores volumes of historical alarm data. In step 506, when alarm records are read in from the active alarm database, all previous alarms are discarded. Any alarm that is active against a node or circuit that does not exist in the topology (read in step 502) is discarded. Also, any alarm that does not map to any existing algorithm (read in step 504) is discarded. By using an active alarm database, which is much smaller in volume than the FM reporting database and is internal to the Process Events 402 component, system performance is enhanced.

Step 506 concludes the initialization process; once current topology, algorithms, and alarms are read, SNMS 300 may begin the continuous process of reading, analyzing, processing, and storing events.

This process begins with step 510, in which the next event in queue is received and identified. The queue is a First In/First Out (FIFO) queue that feeds the Process Events component 402 with network events, topology events, and NMS events. To reiterate, the topology data that are read in step 502 and the alarm data that are read in step 504 are initialization data read in at startup to create a system state. In step 510, ongoing events are read in continuously from process components 404, 406, and 410. These events have already been parsed, and are received as standardized SNMS events. SNMS 300 then identifies the type of event that is being received. If the event is found to be older than a certain threshold, for example one hour, the event is discarded.

In steps 512, 520, 524, and 534 SNMS 300 determines what to do with the event based on the event type identification made in step 510.

In step 512, if the event is determined to be topology data, SNMS 300 updates the GUI displays to reflect the new topology in step 514. Then in step 516, SNMS 300 performs a reconciliation with active alarms to discard any alarm not mapping to the new topology. In step 518, the new topology data is recorded in Process Events 402 memory in the Alarming Server 302.

In step 520, if the event is determined to be NMS data, such as DS-3 alarms 338, it is stored in the FM reporting database on the SNMS Reporting Server 304 for future reference by SNMS rules.

In step 524, if the event is determined to be a defined SS7 network event, then in step 526 one or more algorithms will be invoked for the event. Such algorithms may make use of data retrieved from Network Management Systems 338, Network Maintenance Schedules 340, and Network Topology 334. The algorithms may perform a variety of processing on the event data, such as, for example, correlating events.

As an example of event correlation, when each circuit level algorithm generates an alarm, it performs a check against the Network Maintenance Schedule 340 and NMS 338 records. Each alarm record is tagged if the specified circuit is within a maintenance window (Network Maintenance Schedule 340) or is transported on a DS-3 that has a transmission alarm (NMS 338). While SS7 circuits run at a DS-0 level, the Network Topology Databases 334 provide a DS-3 to DS-0 conversion table. Any DS-0 circuit within the DS-3 is tagged as potentially contained within the transmission fault. Clear records from NMS 338 will cause active SNMS circuit level alarms to be evaluated so that relevant NMS 338 associations can be removed. SNMS clear events will clear the actual SNMS alarm. GUI filters allow users to mask out alarms that fit into a maintenance window or contained within a transmission fault since these alarms do not require SNMS operator actions.

In step 528, active alarms are reconciled with new alarm generations and clears resulting from step 526. In step 530, the GUI displays are updated. In step 532, the new alarm data is stored in the FM reporting database.

In step 534, the event may be determined to be a timer. SNMS algorithms sometimes need to delay further processing of specific conditions for a defined period of time, such as for persistence and rate algorithms. A delay timer is set for this condition and processing of new SNMS events continues. When the time elapses, SNMS 300 treats the expiration of time as an event and performs the appropriate algorithm.

For example, an SS7 link may shut down momentarily with the possibility of functioning again within a few seconds, or it may be down for a much greater period of time due to a serious outage that requires action. SNMS 300, when it receives this event, will assign a timer of perhaps one minute to the event. If the event clears within one minute, SNMS 300 takes no action on it. However, if after the one minute timer has elapsed the event is unchanged (SS7 link is still down), SNMS 300 will proceed to take action.

In step 536, the appropriate algorithm is invoked to take such action. In step 538 active alarms are reconciled with those that were generated or cleared in step 536. In step 540, the GUI displays are updated. In step 542, the new alarm data is stored in the FM reporting database.

As stated previously, SNMS 300 operates in a continuous manner with respect to receiving and processing events. After the data stores in steps 518, 522, 532, and 542, the process returns to step 510.

Figure 6:
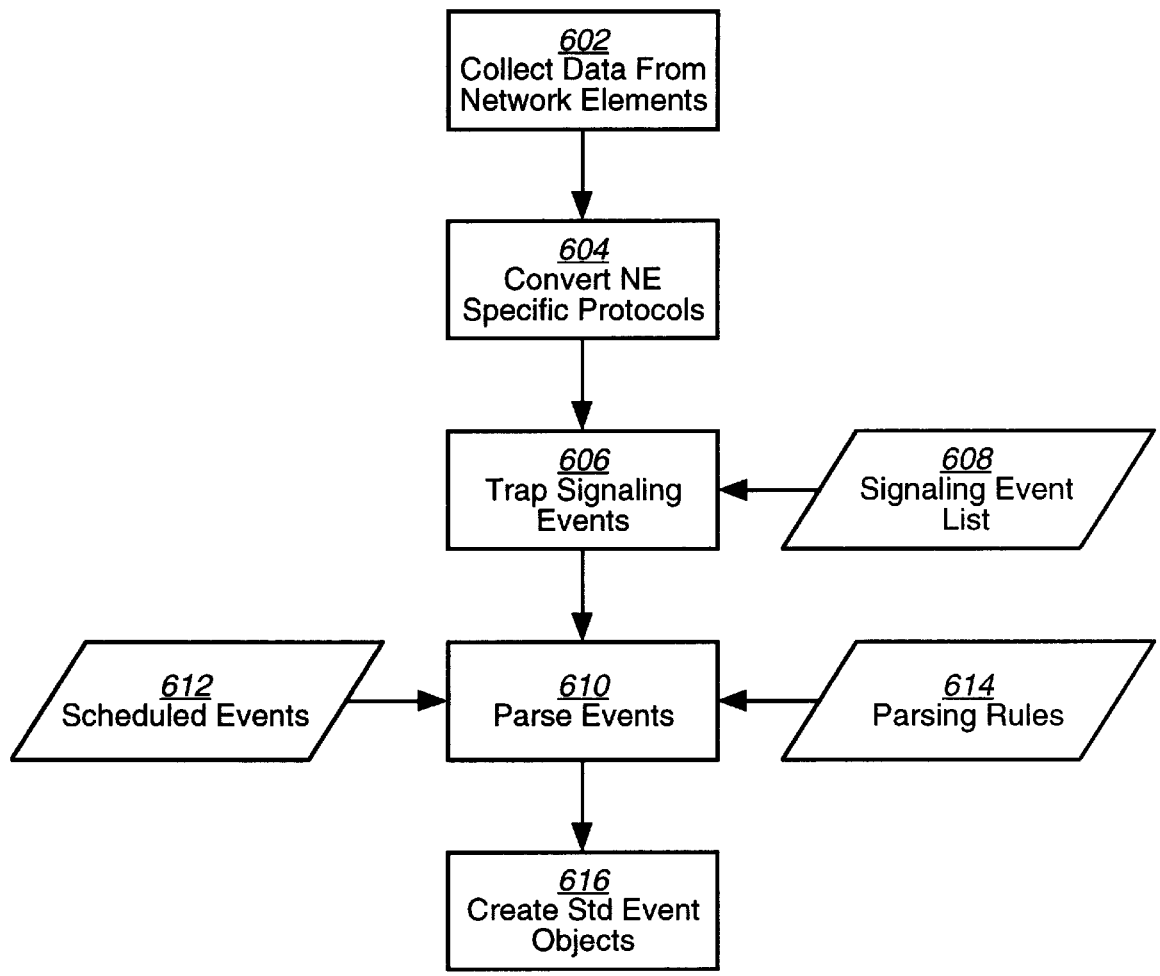

Referring now to FIG. 6, the detailed process of the Receive Network Events component 404 is illustrated. This component collects events from the SS7 network elements via data transport mechanisms, such as the Async Data Network 320, SWIFT 326, X.25 OSS network 328, and the LSE 330. These events are received by the SNMS Alarming Server 302 in a First In/First Out (FIFO) queue.

In steps 602 and 604, events from the SS7 network elements are collected by mainframe applications external to SNMS 300, such as SWIFT 326 and LSE 330, and the protocol of the event data is converted from the network element-specific protocol to SNA or TCP/IP. In one embodiment, SNMS 300 may also have software running on the mainframe that converts the protocol to that recognizable by the SNMS Alarming Server 302. The event data is then transmitted via SNA or TCP/IP to the SNMS Alarming Server 302.

SNMS 300 maintains a Signaling Event List 608 of all SS7 event types that is to be processed. In step 606, SNMS 300 checks the Signaling Event List 608 and if the current event is found in the list, SNMS 300 traps the event for processing. If the event is not found in the list, SNMS 300 discards it.

In step 610, the event is parsed according to defined parsing rules 614. The parsing rules 614 specify which fields are to be extracted from which types of events, and are programmed into the SNMS code. The parsing of events in step 610 extracts only those event data fields needed within the alarm algorithms or displays. Also input to step 610 are scheduled events 612 from the Network Maintenance Schedule 340. Scheduled events 612 are used to identify each network event collected in step 602 that may be a result of scheduled network maintenance. This allows SNMS operators to account for those SS7 network outages that are caused by planned maintenance.

In step 616, the parsed event data is used to create standardized event objects in SNMS resident memory for use by other SNMS processes. Such event objects are read into the main process, Process Events 402, in step 510.

Figure 7A:
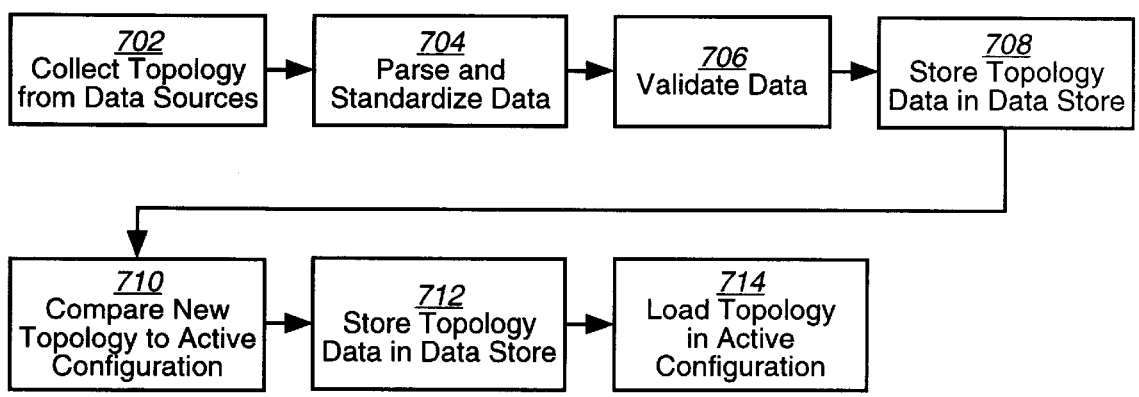

Referring now to FIG. 7a, the detailed process of the Process Topology component 406 is illustrated. This process component retrieves network topology and configuration data from three types of sources, creates standardized topology data records, and stores this data for use by other SNMS processes. In particular, it feeds active topology data to Process Events 402, running on the Alarming Server 302, in step 502.

In step 702, the SNMS Topology server 306 collects topology data from three different sources. It collects current connectivity and configuration data generated by the SS7 network elements via the Control system 332. It collects topology data that has been entered into order entry and engineering systems and stored in Network Topology Databases 334. It also accepts manual overrides 336 via workstation.

The collection of data from the Topology Database 334 and the Control system 332 occurs on a periodic basis, and is performed independently of the SNMS Alarming server 302. Unlike prior art systems that use data retrieved from proprietary PMUs 106, SNMS 300 receives topology data from all types of network elements, including those that are not connected to a PMU 106. SNMS 300 also uses data reflecting the topology of foreign networks, such as those of a Local Exchange Carrier (LEC) or an international carrier. This data is used to perform impact assessments that will allow the SNMS user to determine facts such as which end customers may be impacted by an SS7 link outage. Collected data includes: local exchange carrier office homing arrangements, local exchange carrier signaling point to signal transfer point homing arrangements, numbering plan area and prefix assignments, foreign network signal transfer point clustering, local exchange carrier network signal transfer point clustering and SS7 supported voice trunks. Examples of the types of topology data collected and used by SNMS 300 are illustrated in FIGS. 7b through 7j. Also identified are the data sources for one embodiment of the present invention.

Figure 7B:
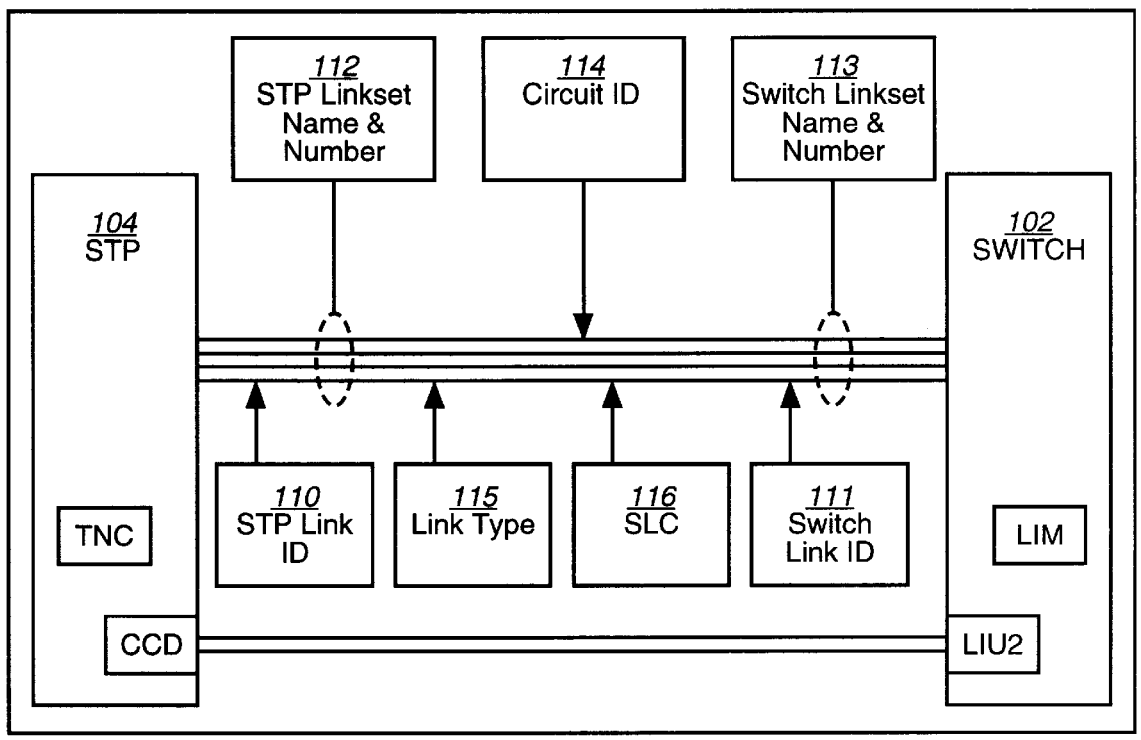
FIGS. 7b–7j are examples of the types of SS7 network topology and configuration that are processed by the present invention.
Figure 7C:
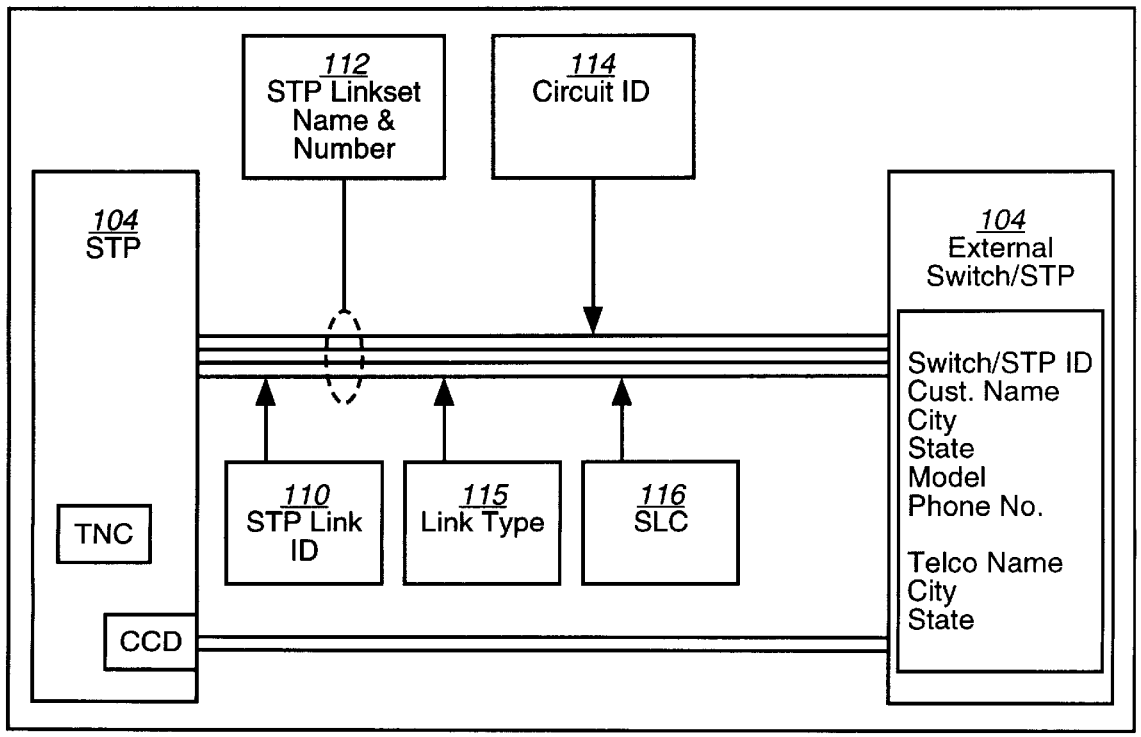

In FIGS. 7b and 7c, for the SS7 linkage of an STP 104 with a Switch/SP 102, data is received by network order entry and engineering systems. This data includes, for example:

| | |
|---|---|
| STP Link ID 110 | Identifies each SS7 link to the STP |
| Switch Link ID 111 | Identifies each SS7 link to the Switch/SP |
| STP Linkset 112 | Identifies a trunk grouping of SS7 links to the STP |
| Switch Linkset 113 | Identifies a trunk grouping of SS7 links to the Switch/SP |
| IEC/Telco Circuit ID 114 | Identifies the SS7 links to external systems. For interfaces between two different networks, each ID (IEC ID and Telco ID) provides an identification of the SS7 link for each network (IEC and a Telco in this example). |
| Link Type 115 | Identifies the type of SS7 link |
| SLC 116 | Signal Link Code |

Figure 7D:
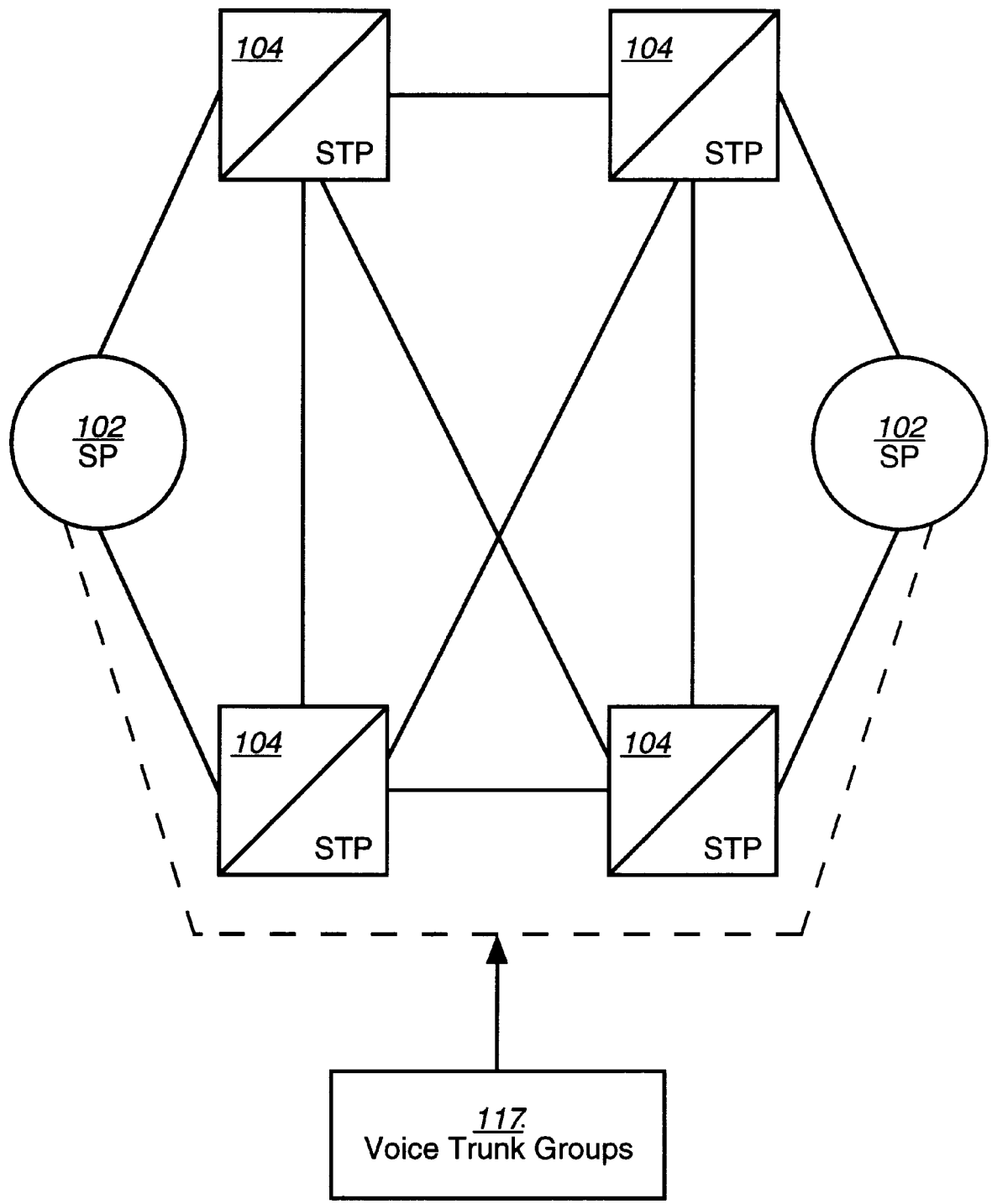

In FIG. 7d, for the switched voice network supported by SS7, data is received by network order entry and engineering systems and used to perform SS7 event impact assessments. This data includes, for example:

| | |
|---|---|
| Voice Trunk Groups 117 | Voice trunk group supported by each SP 102 |

Figure 7E:
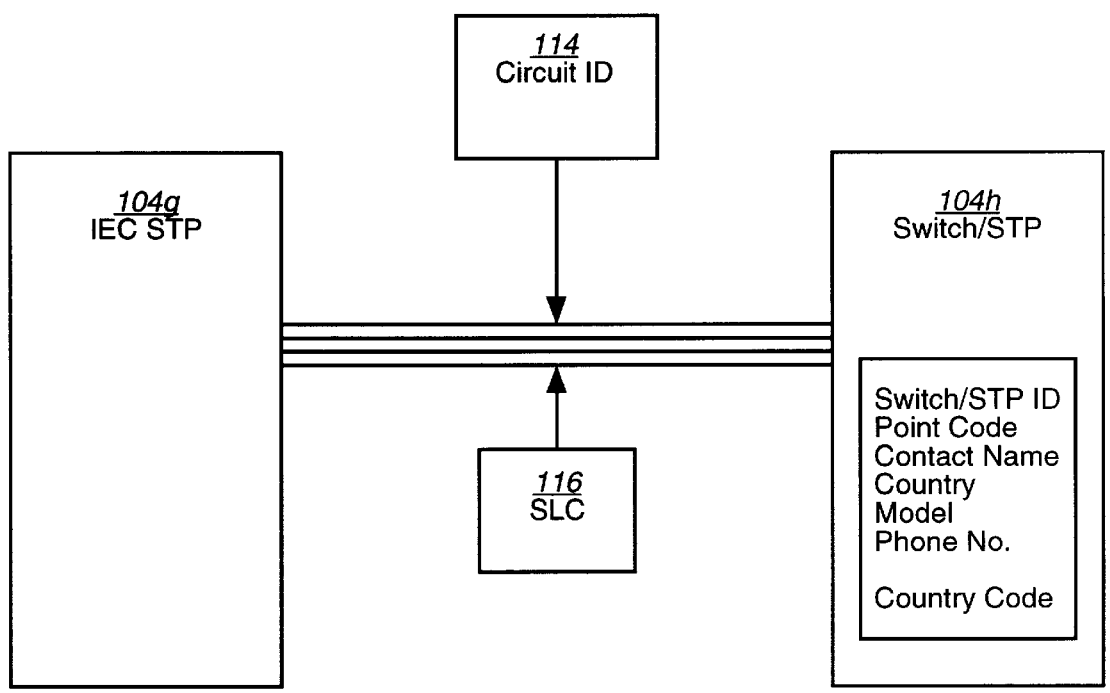

In FIG. 7e, for the SS7 linkage of a domestic STP 104g to an international STP 104h, data is received by network order entry and engineering systems. This data includes, for example:

| | |
|---|---|
| Circuit ID 114 | Identifies the SS7 link to external systems |
| SLC 116 | Signal Link Code |

Figure 7F:
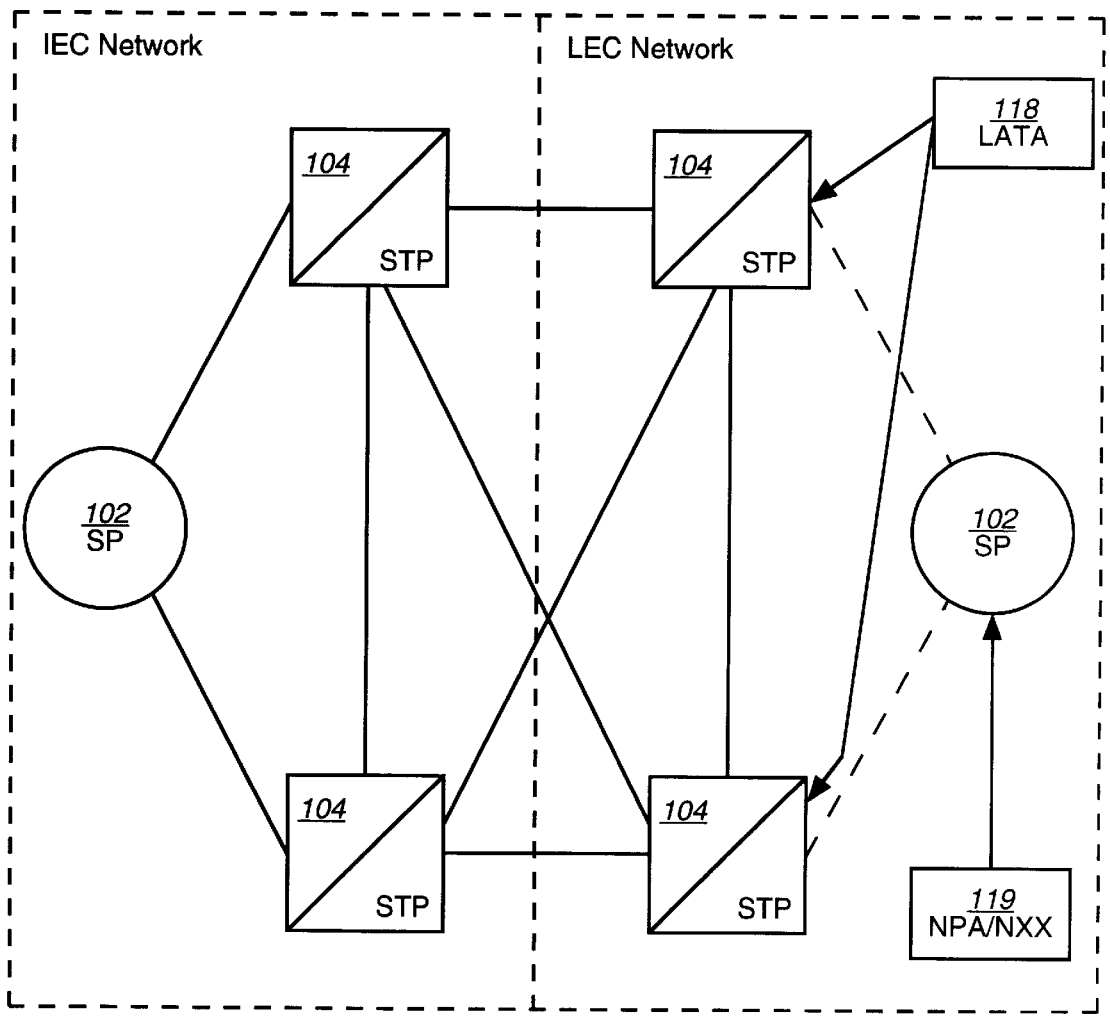
Figure 7G:
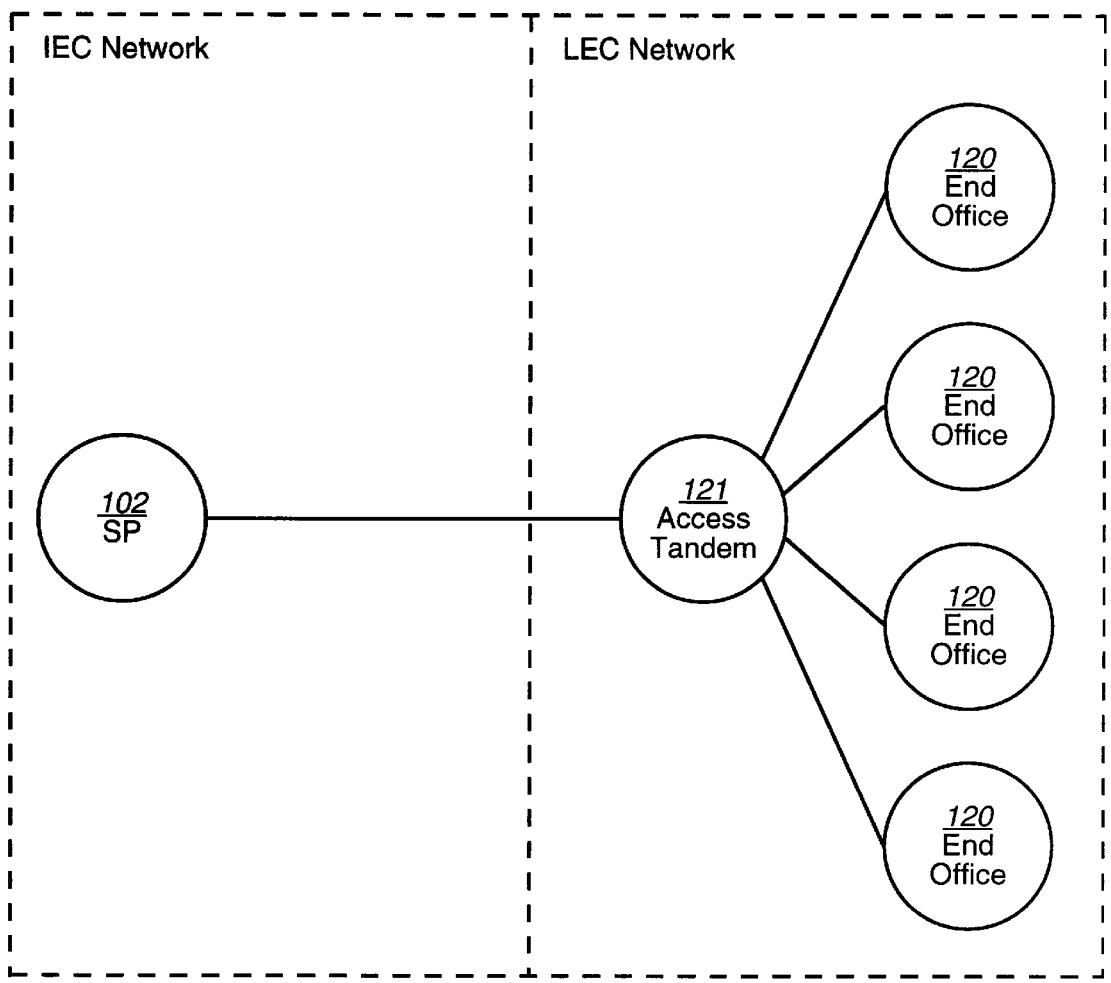

In FIGS. 7f and 7g, for the purpose of performing impact assessments, Local Exchange Carrier (LEC) NPA/NXX assignments and End Office to Access Tandem homing arrangements are received by a calling area database that is populated by Bellcore's Local Exchange Routing Guide (LERG). This data includes, for example:

| | |
|---|---|
| LATA 118 | Local Access Transport Area (conventional) |
| NPA/NXX 119 | Numbering Plan Area/prefix (conventional) |
| End Office 120 | LEC customer serving node |
| Access Tandem 121 | LEC end office hub |

Figure 7H:
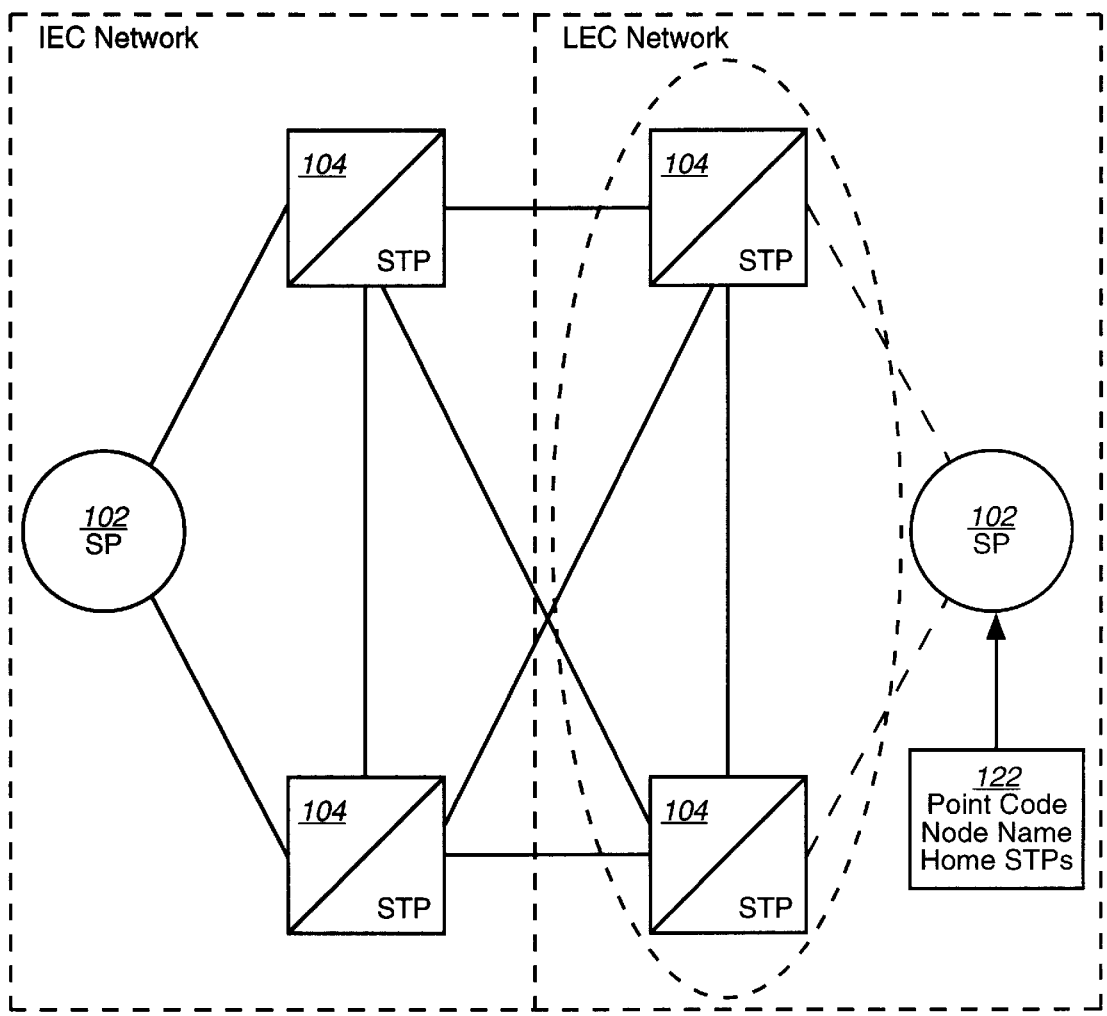

In FIG. 7h, foreign network STP 104 clustering and SP 102 homing arrangements are received by SS7 network elements via the Control system 332. This data includes, for example:

| | |
|---|---|
| Point Code/Node Name/Home STPs 122 | Identifies SS7 node and either Home STP (if SS7 node is SP) or mated pair STP (if SS7 node is STP) |

Figure 7I:
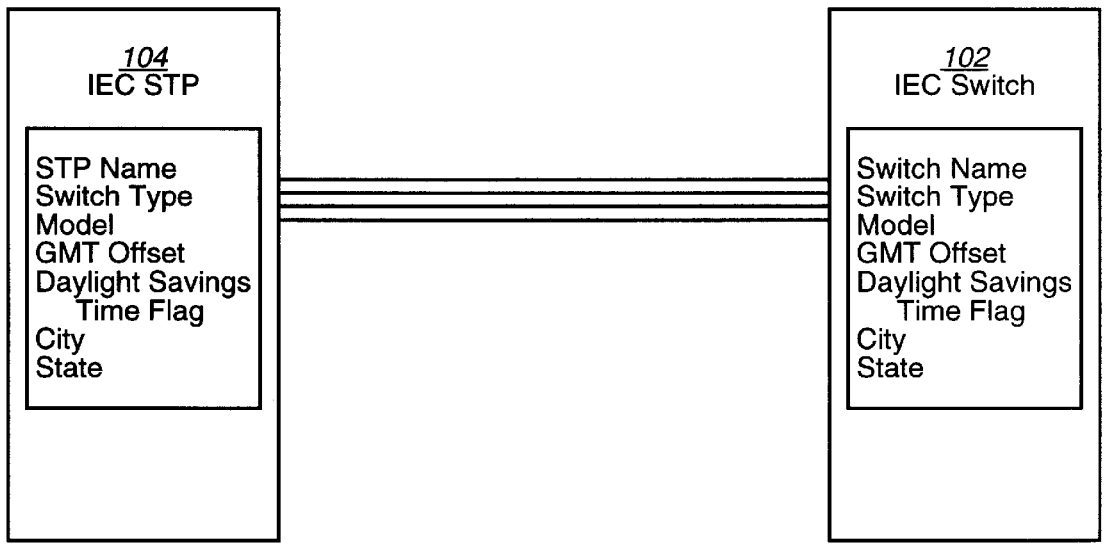

In FIG. 7i, data identifying certain aspects of each network element are received by a Switch Configuration File, which resides in an external system.

Figure 7J:
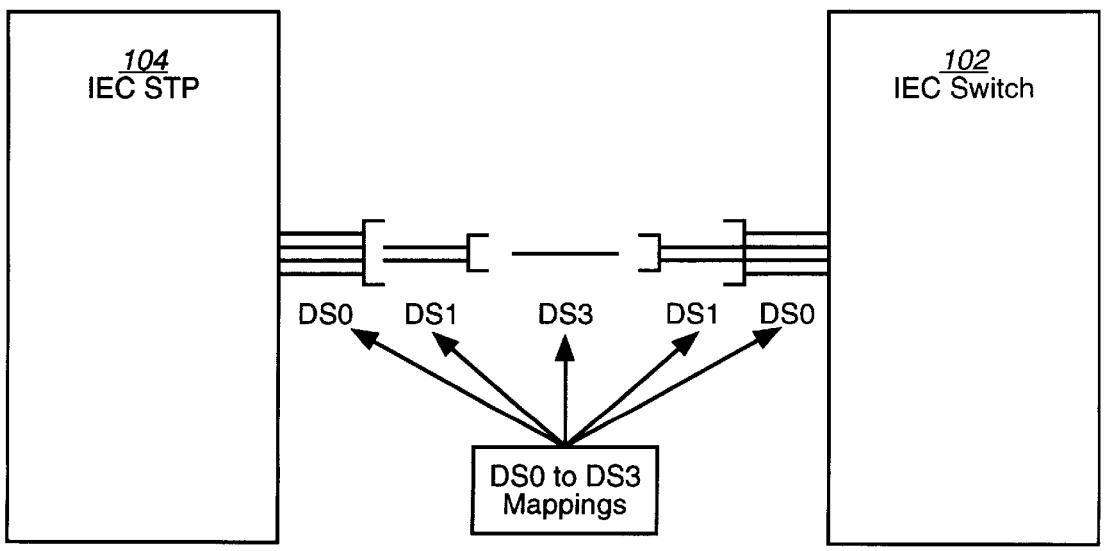

In FIG. 7j, data mapping each network DS-0 onto a DS-3 is received by Network Topology Databases 334. This data is used to assign DS-3 alarms received by NMS 338 to DS-0 level circuits.

In FIG. 7k, data needed to overwrite data acquired through automated processes are provided by manual overrides 336.

Referring now back to FIG. 7a in step 704, the various topology data are parsed to extract the data fields that are needed by SNMS algorithms. The data are then standardized into event records that can be processed by Process Events 402.

In step 706, the standardized data records are validated against other data. For example, circuit topology records are validated against node topology records to ensure that end nodes are identified and defined.

In step 708, the topology data are stored on the Topology server 306 in a relational database, such as that offered by Sybase.

In step 710, the new topology records are passed from the Topology server 306 to the main SNMS process running on the Alarming server 302 and compared against the active configuration (i.e. configuration that is currently loaded into memory). Active alarm and GUI displays are reconciled to remove alarms that pertain to non-existent topology entries.

In step 712, the topology is stored on the Alarming Server 302 (for use by Process Events 402) in the form of flat files for performance reasons. At this time the flat file mirrors the Topology server 306 database from step 708. This flat file is only accessible by the main process.

In step 714, the new topology records are loaded into active SNMS memory and new processes which require topology data now use the new configuration.

Figure 8A:
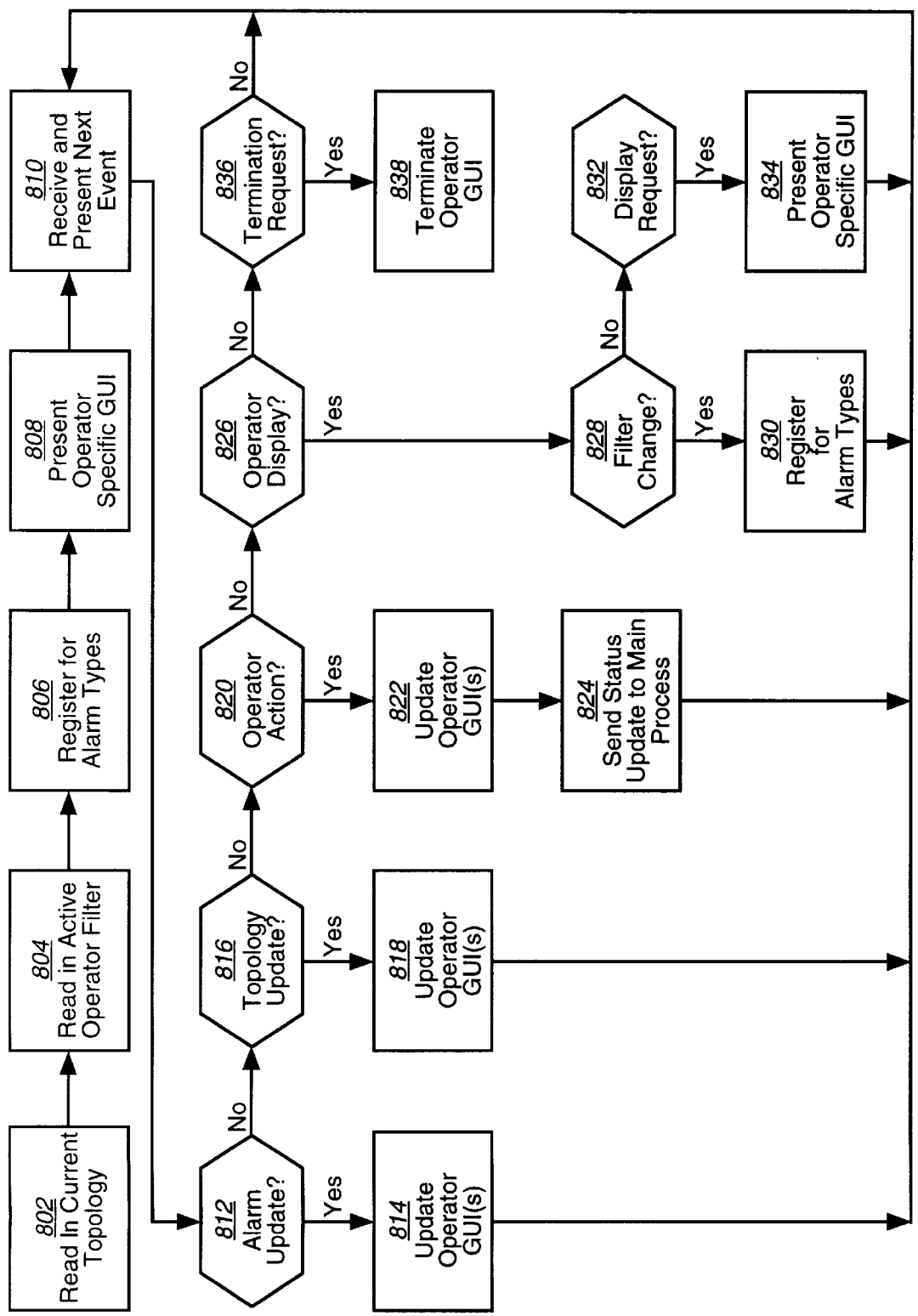

Referring now to FIG. 8a, the detailed process of the Display Alarms component 412 is illustrated. This process component provides the results of SNMS processing to the user (referred to as the "operator"), and accepts operator input as actions to be performed within SNMS 300. Therefore, the process between Display Alarms 412 and Process Events 402 is two-way. It is important to note that while there is a single Process Events process 402 running for the entire SNMS 300 system, there is a different instance of the Display Alarms process 412 running for each operator that is logged onto SNMS 300. That is, each operator instigates a separate execution of Display Alarms 412.

When an operator logs on SNMS 300, the first four steps, 802–808, execute as an initialization. From there, steps 810–838 operate as a continuous loop. The initialization provides each operator with a system state from which to work.

In step 802, the current topology is read in and displayed via Graphical User Interface (GUI). Each operator has its own GUI process that is initialized and terminated based upon an operator request. Each GUI process manages its displays independently. Any status change is handled by the individual processes.

In step 804, a filter that defines the specific operator view is read in. These filters are predefined, but can be modified by each operator to define the view that his/her GUI process will display. Thus, the operator can select those events which will be displayed and those events which will be omitted from display. Filter parameters include:

1. Traffic Alarms, Facility alarms, or both
2. Acknowledged Alarms, Unacknowledged Alarms, or both
3. Alarms on circuits within maintenance windows, Alarms on circuits that are not within a maintenance window, or both.
4. Alarms on circuits that have associated transmission alarms (DS-3 alarms via outage ids), Alarms on circuits that do not have associated transmission alarms, or both.
5. Alarms with a specified severity.
6. Alarms on nodes/circuits owned by a specified customer id.
7. Alarms on International circuits, Alarms on Domestic circuits, or both.

The operator's GUI displays are updated both upon initialization in step 804 and when filter changes are requested in steps 828 and 830.

Each specific operator's instance of the Display Alarms 412 process opens a connection with Process Events 402 so that only alarm records relevant to the specific operator's filter are transmitted. In step 806, the specific operator's process registers itself with Process Events 402 to identify which alarms are to be sent. In step 808, the GUI display is presented to the operator.

The continuous execution of Display Alarms 412 begins in step 810. Each event that is to be retrieved and presented, as defined by the operator filter, is received and identified. In steps 812, 816, 820, 826, and 836 SNMS 300 determines what to do with the event based on the event type identification made in step 810.

In steps 812 and 816, if the event is determined to be an alarm update or a topology update, the operator's GUI display is updated to reflect this, in steps 814 and 818, respectively. Then the next event is received, in step 810.

In step 820, if the event is determined to be an operator action, two activities are required. First, in step 822, the operator's GUI display is updated to reflect the status change. Then, in step 824, a status change update is sent to the main process, Process Events 402, so that the status change may be reflected in SNMS 300 records and other GUI processes (for other operators) can receive and react to the status changes.

In step 826, if the event is determined to be an operator display action, then it is determined if the action is a filter change request or a display request. In step 828, if it is determined to be a filter change request, then in step 830 the GUI process registers with Process Events 402 so that the appropriate alarms records are transmitted. In step 832, if it is determined to be an operator display request, then in step 834 the requested display is presented to the operator. Display requests may include:

1. node detail and connection
2. circuit connection
3. linkset connection
4. unknown topology alarms (alarms on objects that are not defined in the topology databases)
5. STP pair connections
6. Nodes contained within a LATA
7. Home/Mate connections (for non-adjacent nodes)
8. NPA/NXX lists
9. trunk group lists
10. end office access tandem
11. rules definition help screens (aid the operator in understanding the actual algorithm used in generating the alarm
12. recommended actions (operator defined actions that should be taken when a specific alarm is received)

In step 836, if the event is determined to be a termination request, then the specific operator's GUI process is terminated in step 838. Otherwise, the next event is received in step 810.

Within the Display Alarm process, SNMS 300 provides several unique display windows which support fault isolation, impact assessments, and trouble handling. All of the GUI displays which contain node and circuit symbols are "active" windows within SNMS 300 (i.e. screens are dynamically updated when alarm status of the node or circuit change, or when screen display request are issued by an operator). All the displays are possible due to the set of IEC topology sources used within SNMS 300. FIGS. 8b through 8i are illustrations of screen prints from the preferred embodiment of SNMS which depict how the extensive topology processing of SNMS is used in such operator displays.

Figure 8B:
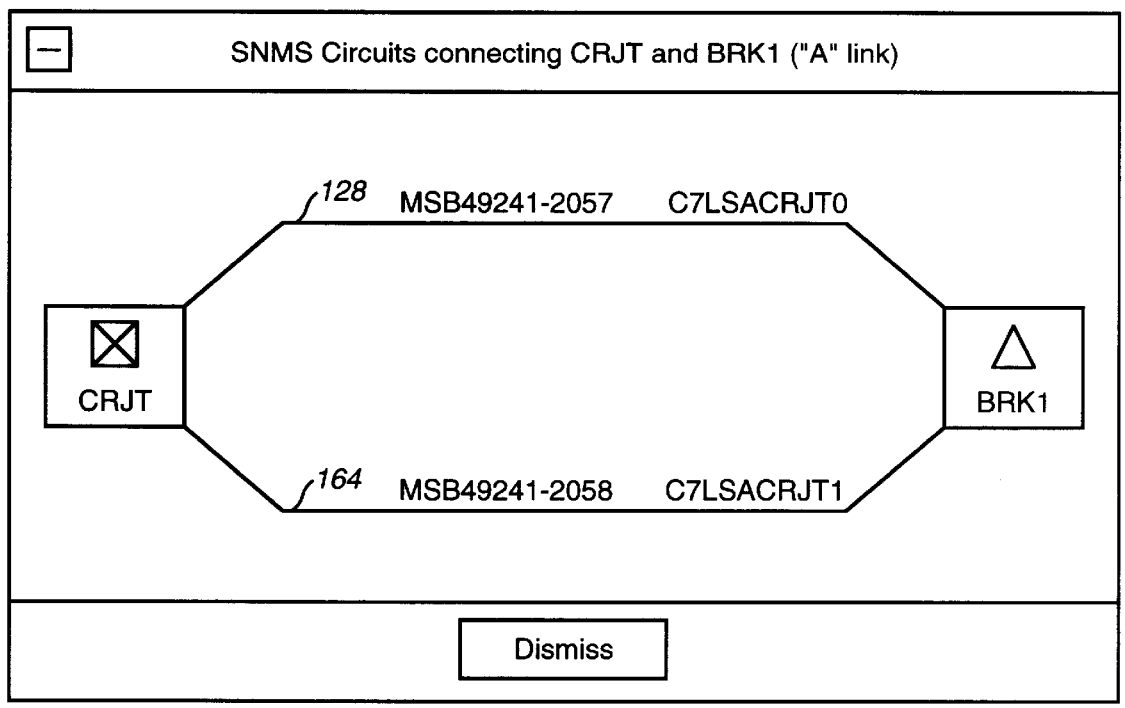

FIG. 8b is an example of an SNMS Circuits Map screen display window. This window displays topology and alarm status information for a selected linkset. As network events are received, SNMS 300 recognizes the relationships between endpoints and isolates the fault by reducing generated alarms. This display allows the operator to monitor a linkset as seen from both sides of the signaling circuit (from the perspective of the nodes), and from the perspective of the PMUs.

Figure 8C:
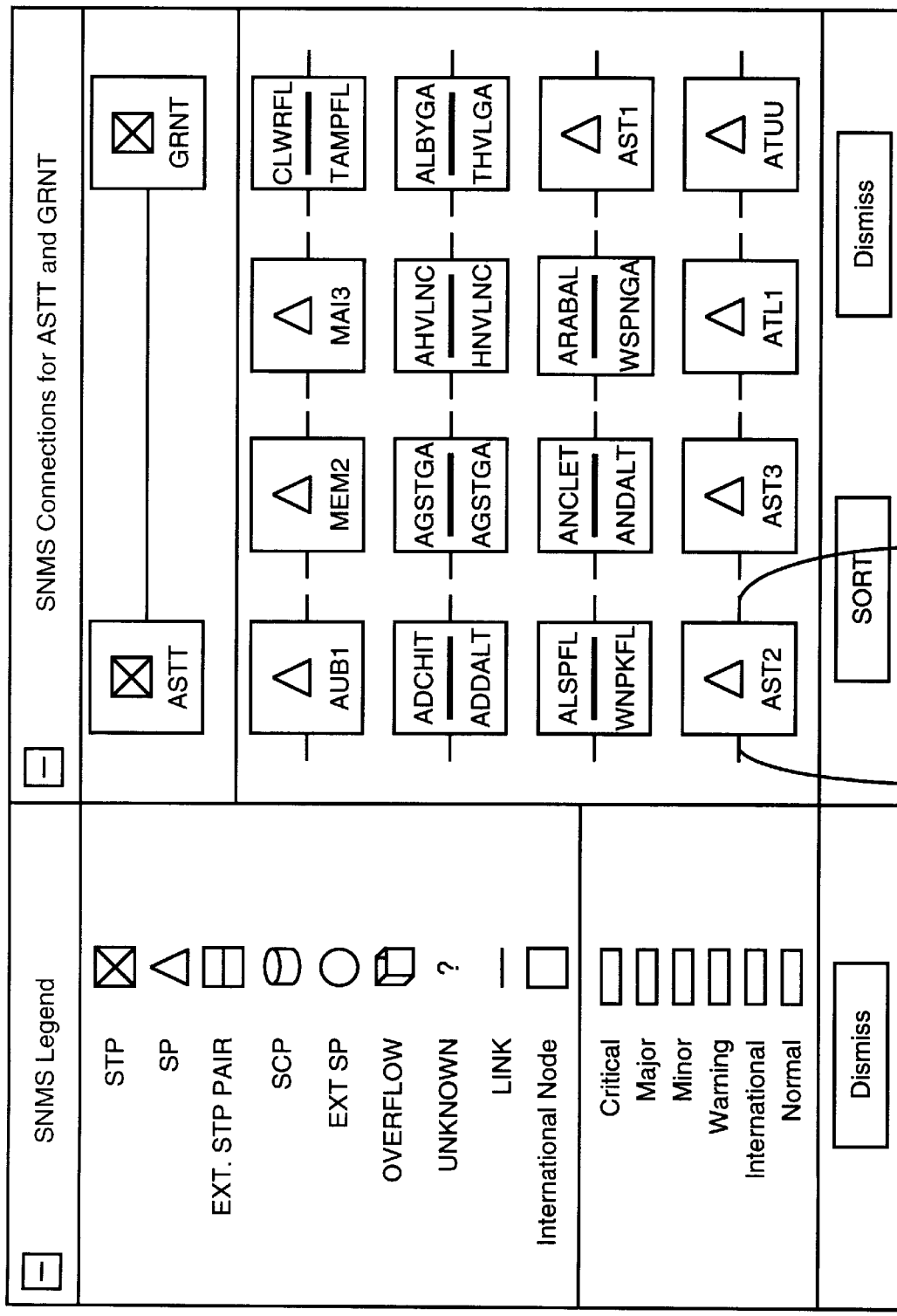

FIG. 8c is an example of an SNMS Connections Map screen display window. This window presents a cluster view of the IEC signaling network. All IEC and non-IEC nodes connected to the IEC STPs in the cluster are displayed along with the associated linksets. A cluster view is important since a single STP failure/isolation is not service impacting, but a cluster failure is since all IEC SPs have connectivity to both IEC STPs in the cluster. Each node is bounded by two distinct lines, one extending from the left, such as line 890, and one extending from the right, such as line 891, that represent linksets to other distinct nodes. By selecting (i.e., mouse point-and-click) a linkset, information pertaining to that linkset is displayed, as illustrated in FIG. 8b.

Figure 8D:
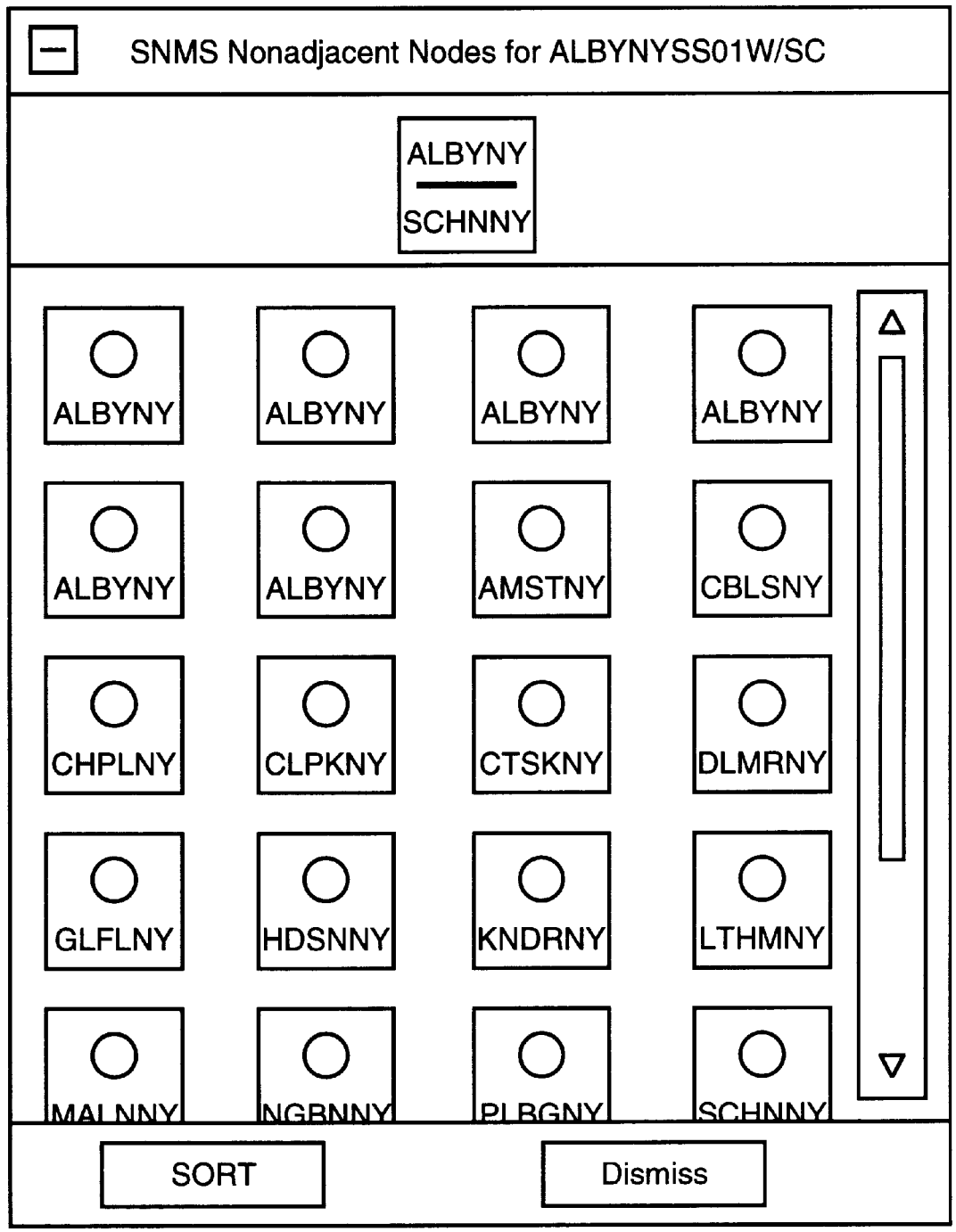

FIG. 8d is an example of an SNMS Nonadjacent Node Map screen display window. This window presents an STP pair view of a selected LEC signaling network. All LEC SPs, STPs, and SCPs (with signaling relationships to the IEC network) connected LEC STP pair are displayed. IEC's area of responsibility does not include the LEC STP to LEC SP signaling links, so no linksets are displayed here. This display allows the SNMS operator to monitor a LEC signaling network as seen by the IEC nodes.

Figure 8E:
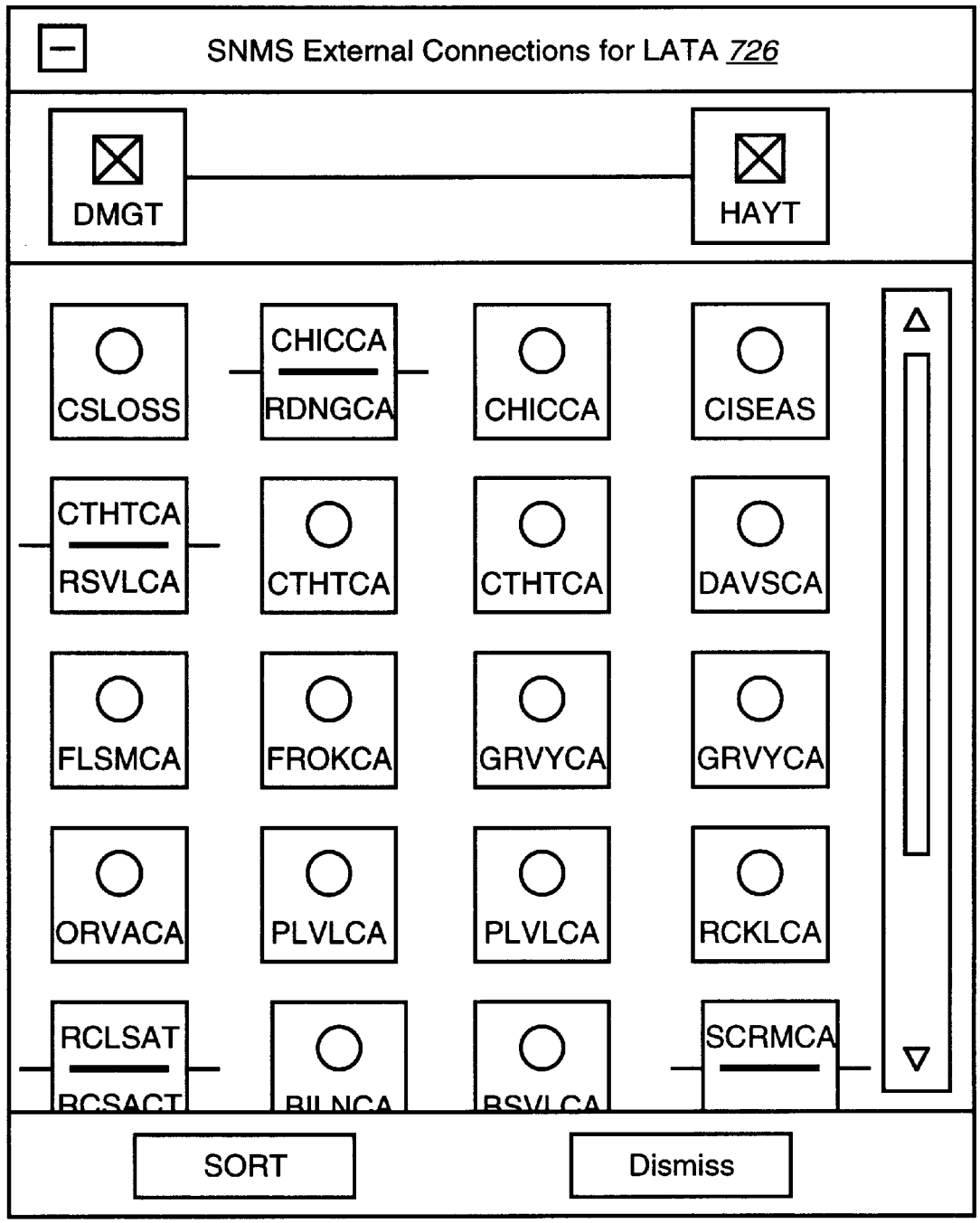

FIG. 8e is an example of an SNMS LATA Connections Map screen display window. This window presents a map of all LEC owned nodes that are located within a specified LATA. As well, the IEC STP pair that serves the LATA is also displayed along with the associated linksets (where applicable). This display allows the operator to closely monitor a specific LATA if/when problems surface within the LATA. LATA problems, while outside IEC's domain of control, can introduce problems within the IEC network since signaling messages are shared between the networks. As well, IEC voice traffic which terminates in the specified LATA can be affected by LATA outages.

FIG. 8f is an example of a NPA-NXX Information List screen display window. This window presents a list of NPX-NXX's served by a specified LEC switch. This display is very valuable during impact assessment periods (i.e. if the specified LEC switch is isolated, which NPA-NXX's are unavailable).

Figure 8G:
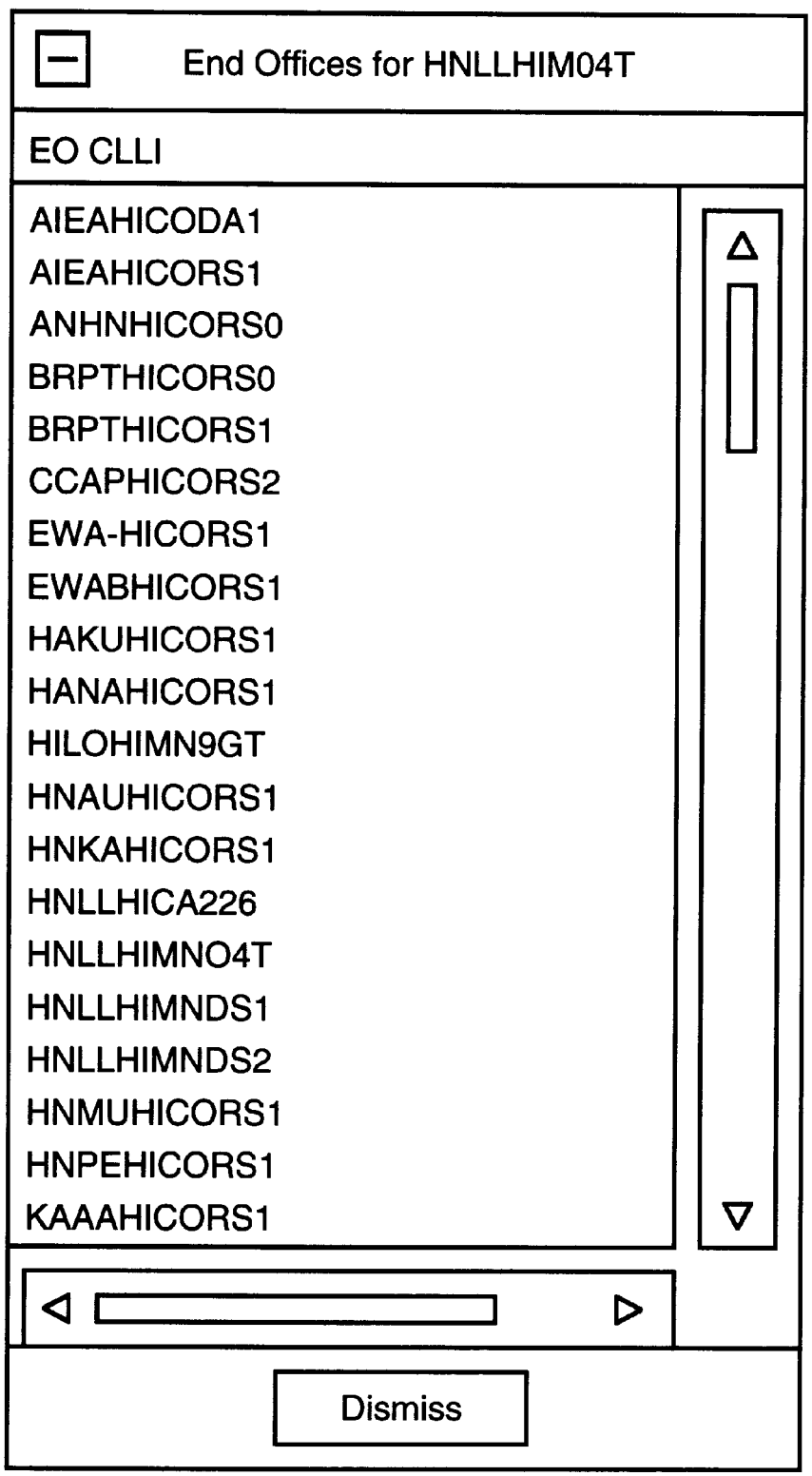

FIG. 8g is an example of an End Office Information List screen display window. This window presents a list of LEC end office nodes which are homed to the specific LEC access tandem. This display is very valuable during impact assessment periods (i.e. if the specified LEC tandem switch is isolated, which end offices are unavailable).

FIG. 8h is an example of a Trunk Group Information List screen display window. This window presents a list of IEC voice trunks, connected to a specified IEC switch, and the LEC end office switches or other IEC switches where they terminate. This display is very valuable during impact assessment periods (i.e. what end offices are impacted when a IEC switch is isolated). This display is also available for selected LEC end office switches.

Figure 8J:
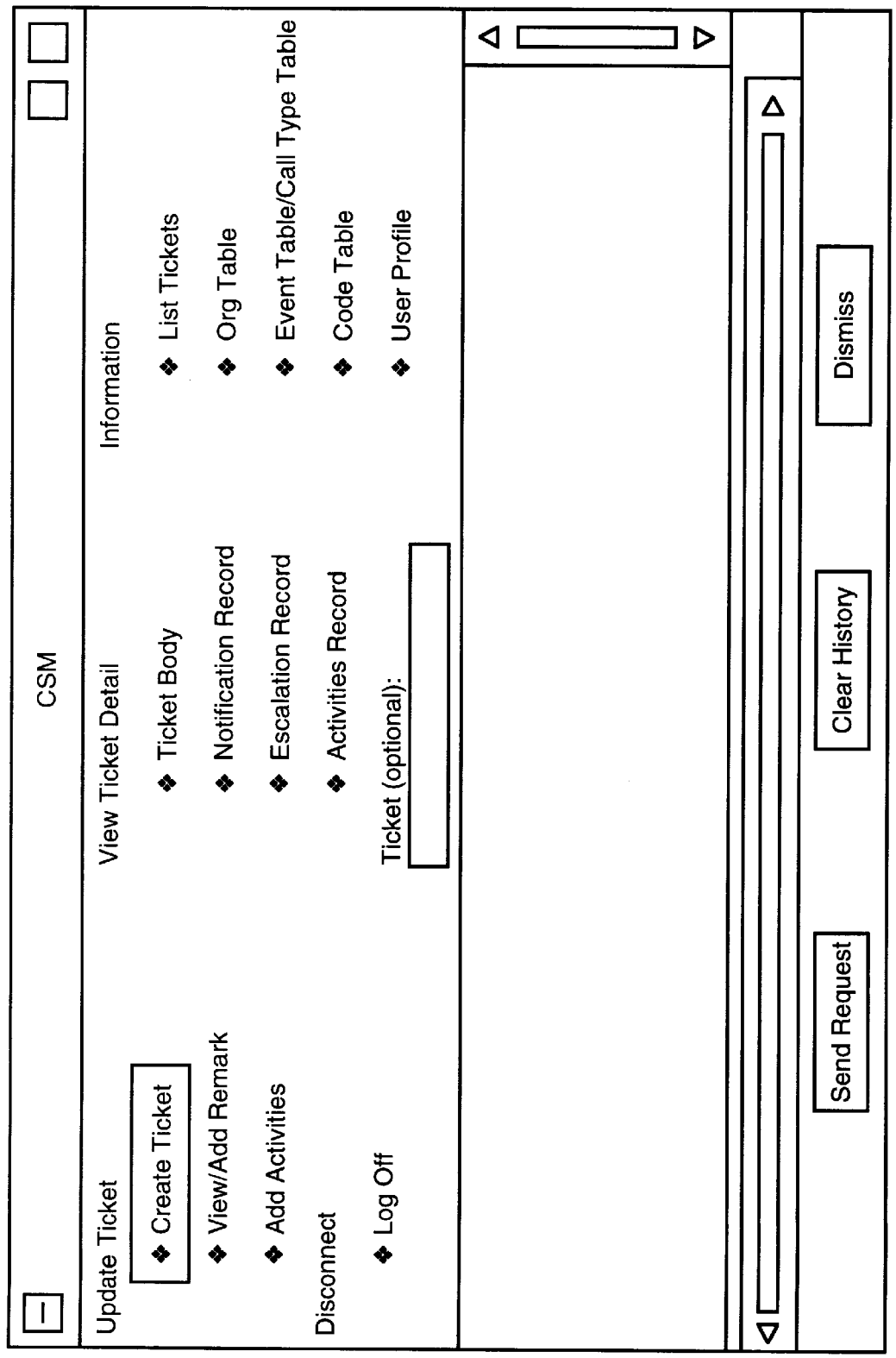

FIG. 8i is an example of a Filter Definition Window screen display window. This window allows the SNMS operator to limit the scope of his displays based on the:

type of alarms that should be presented
severity of alarms that should be presented
acknowledged alarms, unacknowledged alarms, or both
alarms on circuits inside a planned outage window, alarms on circuits outside a planned outage window or both
alarms that are not the result of a specified transmission network outage
alarms on specified customer nodes or alarms on circuits connected to specified customer FIG. 8j is an example of a Trouble Ticket Window screen display window. The SNMS operator can open trouble tickets on signaling alarms. These trouble tickets are opened in a trouble management system 342. Operators can also display the status of existing trouble tickets.

Figure 9:
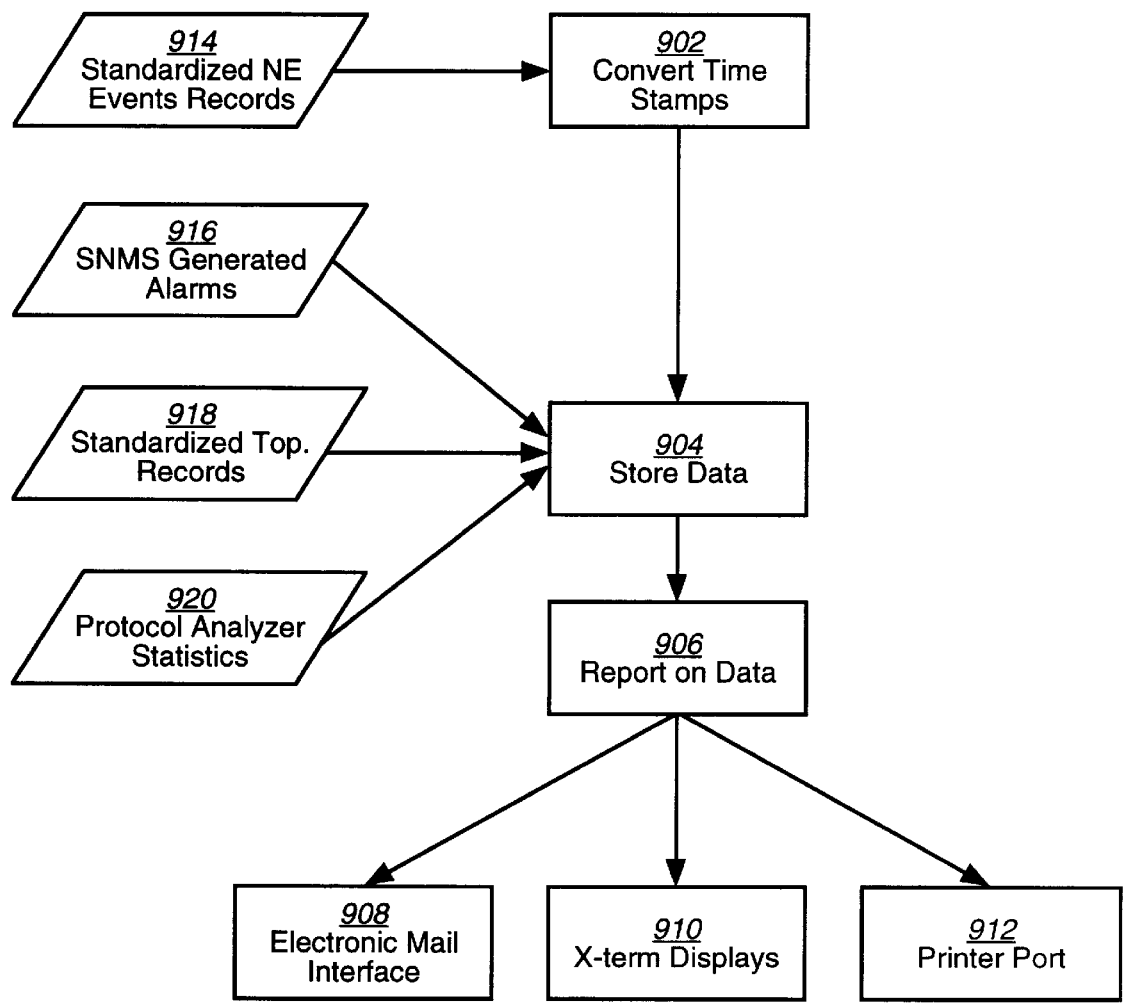

Referring now to FIG. 9, the detailed process of the Report On Data component 414 is illustrated. This process component, which runs on the Reporting server 304, stores SNMS-processed data and provides reports.

Standardized Network Element (NE) Event Records 914 are received with location specific time stamps. In step 902, the time stamps are converted into Greenwich Mean Time (GMT) so that standardized reports can be produced.

In step 904, all data received are stored in individual database tables. Data may also be archived for long-term storage to tape or disk. This data includes SNMS-generated alarms 916, standardized topology records 918, and performance statistics from PMUs 920. It may also include non-processed data, such as DS-3 alarms from NMS 338 and network maintenance schedule data 340.

In step 906, reports are produced. These reports may be custom or form reports. They may also be produced on demand, or per a schedule. These reports may be presented in a number of ways, including but not limited to electronic mail 908, X-terminal displays 910, and printed reports 912.

Although specific embodiments of the present invention have been described, it will be seen by those of skill in the art that other embodiments, which are equivalent, are possible.

What is claimed is:

1. A system for managing information related to a signaling network, the signaling network including plural network elements generating plural network events, the system comprising:

network event receiving means coupled to said network elements for receiving said network events, said network events received by said network event receiving means including topology information;

network event standardizing means responsive to events received by said network event receiving means for converting the received network events to standard form;

network event correlating means responsive to the standard form events for correlating the standard form events;

a network maintenance scheduling system with an output to said network event correlating means, said network event correlating means correlates network events with network maintenance scheduling information;

display means for displaying correlated standard form events;

a network topology data base storing information related to network topology;

means responsive to said network topology data base for creating standard form events from said network topology data base; and means coupling said created standard form events to said network event correlating means.

2. The system of claim 1, wherein the display means comprises an event selection device, selecting a network event for display on predefined parameters.

3. The system of claim 1, wherein the display means comprises an event selection device, selecting a network event for omission from display based on predefined parameters.

4. The system of claim 1, wherein the display means comprises an event selection device, selecting a network event for display based on user-entered parameters.

5. The system of claim 1, wherein the display means comprises an event selection device, selecting a network event for omission from display based on user-entered parameters.

6. The system of claim 1, wherein the network event receiving means receives information relating to network topology from the network elements in near real-time.

7. The system of claim 1 which further includes a transmission alarm receiver receiving information related to transmission alarms from an external network management system.

8. The system of claim 1, wherein the display means comprises an event selection device, coupled to the network event correlating means, selecting for omission from the display those network events which have been correlated with network maintenance events.

9. The system of claim 8, further comprising an impact assessment device generating assessments of an impact of a signaling network outage on network maintenance events.

10. The system of claim 1, further comprising an impact assessment device generating impact assessments of network events on the signaling network based on topology and configuration information.

11. The system of claim 10, wherein the topology and configuration information includes information relating to at least one of:

local exchange carrier office homing arrangements;

local exchange carrier signaling point to signal transfer point homing arrangements;

numbering plan area and prefix assignments;

foreign network signal transfer point clustering;

local exchange carrier network signal transfer point clustering; and signaling supported voice trunks.

12. The system of claim 1, wherein the network event correlating means is responsive to time generated signals.

13. The system of claim 1, wherein said display means includes a trouble ticket entry device, accepting trouble ticket entries from system operators, and which further comprises an interface to a trouble management system, coupled to the trouble ticket entry device, transmitting entered trouble tickets to the external trouble management system.

14. The system of claim 1, wherein the network event correlating means is responsive to transmission alarms received from an external network management system.

15. The system of claim 7, wherein the display means comprises an event selection device, coupled to the network event correlating means selecting for display those network events which have been correlated with transmission alarms received from the external network management system.

16. The system of claim 1, wherein the display means comprises an event selection device, coupled to the network event correlating means, selecting for display those network events relating to a single customer.

17. The system of claim 1, wherein the display means comprises an event selection device, coupled to the network event correlating means, selecting for omission from display those network events relating to a single customer.

18. A method of managing information related to a signaling network, where the signaling network includes plural network elements which generate plural network events, the method comprising the steps of:

receiving network events from the network elements, where the network events include topology information;

standardizing the received network events to produce standard form events;

correlating the standard form events, including receiving information relating to a network maintenance schedule from a network maintenance scheduling system and correlating the standard form events with the received network maintenance schedule information;

displaying the correlated standard form events;

providing a network topology data base storing information related to network topology; creating standard form events from said network topology data base; and correlating said created standard form events along with the standard form events.

19. The method of claim 18, wherein step of displaying the correlated standard form events includes the steps of:

selecting correlated standard form events based on pre-defined parameters; and displaying the selected standard form events.

20. The method of claim 18, wherein step of displaying the correlated standard form events includes the steps of:

selecting correlated standard form events based on pre-defined parameters; and omitting from display the selected standard form events.

21. The method of claim 18, wherein step of displaying the correlated standard form events includes the steps of:

receiving user-defined parameters from the system operators;

selecting correlated standard form events based on the received parameters; and displaying the selected standard form events.

22. The method of claim 18, wherein step of displaying the correlated standard form events includes the steps of:

receiving user-defined parameters from the system operators;

selecting correlated network events based on the received parameters; and omitting from display the selected network events.

23. The method of claim 18, wherein the network events comprising topology information are received from the network elements in near real-time.

24. The method of claim 18 which includes the further step of receiving transmission alarm information related to transmission alarms from an external network management system.

25. The method of claim 18, wherein the step of displaying the correlated standard form events comprises the step of selecting for omission from display those network events which have been correlated with network maintenance events.

26. The method of claim 25, further comprising the step of generating assessments of an impact of a signaling network outage of network maintenance events.

27. The method of claim 18, further comprising the step of generating impact assessments of network events on the signaling network based on topology and configuration information.

28. The method of claim 27, wherein the topology and configuration information includes information relating to at least one of:

local exchange carrier office homing arrangements;

local exchange carrier signaling point to signal transfer point homing arrangements; numbering plan area and prefix assignments;

foreign network signal transfer point clustering;

local exchange carrier network signal transfer point clustering; and signaling supported voice trunks.

29. The method of claim 18 wherein the step of correlating the standard form events comprises the steps of:

starting a timer when a first network event is received; and detecting expiration of the timer and continuing with the correlation.

30. The method of claim 18, further comprising the steps of:

accepting trouble ticket entries from a system operator; and transmitting entered trouble tickets to an external trouble management system.

31. The method of claim 18, wherein the step of correlating standard form events comprises the steps of:

receiving transmission alarms from an external network management system; and correlating network events with the received transmission alarms.

32. The method of claim 31, wherein the step of displaying the correlated standard form events comprises the steps of:

selecting those network events which have been correlated with transmission alarms received from the external network management system; and displaying the selected network events.

33. The method of claim 18, wherein the step of displaying the correlated standard form events comprises the steps of:

selecting those network events relating to a single customer; and displaying the selected network events.

34. The method of claim 18, wherein the step of displaying the correlated standard form events comprises the steps of:

selecting those network events relating to a single customer; and omitting from display the selected network events.

35. The method of claim 18, wherein the step of displaying the correlated standard form events comprises the steps of:

receiving an indication of an event selected by the system operator; and displaying all alarms correlated with the selected event.

* * * * *